US012666125B2

(12) United States Patent
Park

(10) Patent No.: US 12,666,125 B2
(45) Date of Patent: Jun. 23, 2026

(54) APPLICATIONS FOR ANAMORPHIC LENSES

(71) Applicant: SoftEye, Inc., San Diego, CA (US)

(72) Inventor: Edwin Chongwoo Park, San Diego, CA (US)

(73) Assignee: SoftEye, Inc., San Diego, CA (US)

( * ) Notice: Subject to any disclaimer, the term of this patent is extended or adjusted under 35 U.S.C. 154(b) by 0 days.

(21) Appl. No.: 18/316,225

(22) Filed: May 11, 2023

(65) Prior Publication Data

US 2024/0380961 A1      Nov. 14, 2024

(51) Int. Cl.
H04N 23/55       (2023.01)
H04N 23/54       (2023.01)

(52) U.S. Cl.
CPC ............. H04N 23/55 (2023.01); H04N 23/54 (2023.01)

(58) Field of Classification Search
None
See application file for complete search history.

(56) References Cited

U.S. PATENT DOCUMENTS

| | | | | |
|---|---|---|---|---|
| 5,184,223 | A | * | 2/1993 | Mihara .................. G02B 13/08 |
| | | | | 359/671 |
| 6,570,498 | B1 | * | 5/2003 | Frost ...................... H04N 7/186 |
| | | | | 340/540 |
| 9,131,220 | B2 | | 9/2015 | Givon |
| 9,471,153 | B1 | | 10/2016 | Ivanchenko |

| | | | |
|---|---|---|---|
| 9,619,105 | B1 | 4/2017 | Dal Mutto |
| 9,741,169 | B1 | 8/2017 | Holz |
| 11,415,808 | B1 | 8/2022 | Sharma et al. |
| 11,438,514 | B1 | 9/2022 | Guzik et al. |
| 11,665,330 | B2 | 5/2023 | Andrews et al. |
| 11,847,266 | B2 | 12/2023 | Lee et al. |
| 11,895,414 | B1 | 2/2024 | Kadambala et al. |
| 12,028,624 | B2 | 7/2024 | Aldridge et al. |
| 2013/0106681 | A1 | 5/2013 | Eskilsson et al. |
| 2013/0279756 | A1 | 10/2013 | Menadeva et al. |
| 2015/0049017 | A1 | 2/2015 | Weber et al. |
| 2015/0206280 | A1 * | 7/2015 | Ono ..................... H04N 23/843 |
| | | | 348/223.1 |

(Continued)

FOREIGN PATENT DOCUMENTS

| | | | | |
|---|---|---|---|---|
| CN | 114009006 | A | * | 2/2022 ............. H04N 23/61 |
| EP | 3836540 | A1 | | 6/2021 |

(Continued)

OTHER PUBLICATIONS

U.S. Appl. No. 18/061,203, filed Dec. 2, 2022, Te-Won Lee.

(Continued)

*Primary Examiner* — Hung Q Dang
(74) *Attorney, Agent, or Firm* — Wang Hardoon, P.C.

(57)       ABSTRACT

Novel applications for anamorphic lenses in smart glasses. Anamorphic lenses preserve straightness of motion and lines (i.e., "linearity"). As a practical matter, existing computer vision models can be used with anamorphic images without re-training or intermediate conversion steps (unlike fisheye lenses). The contents of the present disclosure provide substantial improvements for applications that have different FOV requirements along different axis. Solutions for ergonomic hand placement (relative to gaze), non-square photosites, binning and eye-tracking are discussed throughout.

20 Claims, 13 Drawing Sheets

(56) References Cited

U.S. PATENT DOCUMENTS

| | | | |
|---|---|---|---|
| 2015/0338915 A1 | 11/2015 | Publicover et al. | |
| 2016/0170186 A1 | 6/2016 | Neil | |
| 2016/0274762 A1 | 9/2016 | Lopez et al. | |
| 2017/0070653 A1* | 3/2017 | Irschick | H04N 13/282 |
| 2017/0249009 A1 | 8/2017 | Parshionikar | |
| 2018/0081178 A1 | 3/2018 | Shpunt | |
| 2018/0368074 A1 | 12/2018 | Gong et al. | |
| 2019/0248302 A1* | 8/2019 | Lee | H04N 23/698 |
| 2019/0324529 A1 | 10/2019 | Stellmach et al. | |
| 2019/0362557 A1 | 11/2019 | Lacey et al. | |
| 2020/0382717 A1 | 12/2020 | Chiu et al. | |
| 2021/0072831 A1 | 3/2021 | Edwards | |
| 2021/0183023 A1 | 6/2021 | Nakajima et al. | |
| 2021/0185204 A1* | 6/2021 | Weinstock | H04N 13/172 |
| 2021/0201661 A1 | 7/2021 | Jazaery et al. | |
| 2021/0248427 A1 | 8/2021 | Guo et al. | |
| 2021/0373657 A1 | 12/2021 | Connor et al. | |
| 2022/0101593 A1 | 3/2022 | Rockel et al. | |
| 2022/0121100 A1 | 4/2022 | Akamatsu et al. | |
| 2022/0122219 A1 | 4/2022 | Lee et al. | |
| 2022/0196995 A1 | 6/2022 | Li et al. | |
| 2022/0300753 A1* | 9/2022 | Bapat | H04N 7/18 |
| 2022/0326367 A1 | 10/2022 | Matuszak et al. | |
| 2022/0391697 A1 | 12/2022 | Mousavi et al. | |
| 2023/0028426 A1* | 1/2023 | Nadeem | H04N 19/176 |
| 2023/0038159 A1 | 2/2023 | Holland et al. | |
| 2023/0049339 A1* | 2/2023 | Ganguly | H04N 23/80 |
| 2023/0118074 A1 | 4/2023 | Park et al. | |
| 2023/0137004 A1* | 5/2023 | Huizen | B60R 1/12 |
| | | | 348/77 |
| 2023/0194882 A1 | 6/2023 | Yu et al. | |
| 2023/0305632 A1 | 9/2023 | Lee et al. | |
| 2023/0333384 A1 | 10/2023 | Zhu et al. | |
| 2023/0368326 A1 | 11/2023 | Lee et al. | |
| 2023/0368328 A1 | 11/2023 | Lee et al. | |
| 2023/0370752 A1 | 11/2023 | Lee et al. | |
| 2023/0418034 A1 | 12/2023 | Woodgate et al. | |
| 2023/0418068 A1 | 12/2023 | Woodgate et al. | |
| 2024/0019699 A1 | 1/2024 | Sudoh | |
| 2024/0118549 A1 | 4/2024 | Sudoh et al. | |
| 2024/0251185 A1* | 7/2024 | Jang | H04N 25/766 |
| 2024/0288671 A1 | 8/2024 | Dewald et al. | |
| 2024/0323507 A1 | 9/2024 | Knutsson et al. | |

FOREIGN PATENT DOCUMENTS

| | | | |
|---|---|---|---|
| JP | 2007043392 A * | 2/2007 | |
| KR | 20160139189 A | 12/2016 | |
| WO | 2019194906 A1 | 10/2019 | |

OTHER PUBLICATIONS

U.S. Appl. No. 18/061,226, filed Dec. 2, 2022, Te-Won Lee.
U.S. Appl. No. 18/061,257, filed Dec. 2, 2022, Te-Won Lee.
U.S. Appl. No. 18/185,362, filed Mar. 16, 2023, Edwin Chongwoo Park.
U.S. Appl. No. 18/185,364, filed Mar. 16, 2023, Edwin Chongwoo Park.
U.S. Appl. No. 18/185,366, filed Mar. 16, 2023, Edwin Chongwoo Park.
U.S. Appl. No. 18/316,181, filed May 11, 2023, Te-Won Lee.
U.S. Appl. No. 18/316,203, filed May 11, 2023, Edwin Chongwoo Park.
U.S. Appl. No. 18/316,206, filed May 11, 2023, Te-Won Lee.
U.S. Appl. No. 18/316,214, filed May 11, 2023, Te-Won Lee.
U.S. Appl. No. 18/316,218, filed May 11, 2023, Edwin Chongwoo Park.
U.S. Appl. No. 18/316,221, filed May 11, 2023, Edwin Chongwoo Park.
U.S. Appl. No. 18/316,225, filed May 11, 2023, Edwin Chongwoo Park.
U.S. Appl. No. 63/491,733, filed Mar. 22, 2023, Edwin Chongwoo Park.
U.S. Appl. No. 18/745,027, filed Jun. 17, 2024, SoftEye, Inc.
U.S. Appl. No. 18/745,233, filed Jun. 17, 2024, SoftEye, Inc.
U.S. Appl. No. 18/745,353, filed Jun. 17, 2024, SoftEye, Inc.
U.S. Appl. No. 18/745,462, filed Jun. 17, 2024, SoftEye, Inc.
Vaswani et al., "Attention Is All You Need," 31st Conference on Neural Information Processing Systems (NIPS 2017).

* cited by examiner

VERTICAL VIEW ANGLE

HORIZONTAL VIEW ANGLE

NON-SQUARE COLOR FILTER ARRAY    NON-SQUARE PHOTOSITE COLLECTORS    PIXEL VALUE

PUPILLARY DISTANCE

ANAMORPHIC EYE-TRACKING CAMERA SPACING

APPLICATIONS FOR ANAMORPHIC LENSES

RELATED APPLICATIONS

This application is related to U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,257 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/185,362 filed Mar. 16, 2023, and entitled "APPARATUS AND METHODS FOR AUGMENTING VISION WITH REGION-OF-INTEREST BASED PROCESSING", U.S. patent application Ser. No. 18/185,364 filed Mar. 16, 2023, and entitled "APPARATUS AND METHODS FOR AUGMENTING VISION WITH REGION-OF-INTEREST BASED PROCESSING", U.S. patent application Ser. No. 18/185,366 filed Mar. 16, 2023, and entitled "APPARATUS AND METHODS FOR AUGMENTING VISION WITH REGION-OF-INTEREST BASED PROCESSING", U.S. patent application Ser. No. 18/316,203 filed May 11, 2023, and entitled "APPLICATIONS FOR ANAMORPHIC LENSES", U.S. patent application Ser. No. 18/316,218 filed May 11, 2023, and entitled "APPLICATIONS FOR ANAMORPHIC LENSES", and U.S. patent application Ser. No. 18/316,221 filed May 11, 2023, and entitled "APPLICATIONS FOR ANAMORPHIC LENSES", each of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of digital image capture. More particularly, the present disclosure relates to systems, computer programs, devices, and methods that may be improved by anamorphic lenses.

DESCRIPTION OF RELATED TECHNOLOGY

Computer vision refers to the field of artificial intelligence and computer science that enables computers to interpret and understand the visual world. Incipient research is directed toward algorithms and techniques that can extract information from digital images or videos, and then use that information to make decisions or take actions. Computer vision applications are used in a wide range of industries and fields, including healthcare, automotive, surveillance, entertainment, and robotics. Some common examples of computer vision applications include facial recognition, object detection, image segmentation, and gesture recognition.

Most computer vision algorithms are trained from image libraries. The most common types of image data are "rectilinear". A rectilinear image preserves straightness and perspective. In other words, a rectilinear lens produces an image that closely resembles what humans perceive with their eyes. While there are camera lenses that introduce various forms of optical distortion, these are not commonly used for computer vision training because the training process is time consuming and expensive.

There are very few applications that use computer vision in non-rectilinear formats; typically, these applications convert non-rectilinear data to rectilinear formats prior to computer vision processing. Once converted, the images can be processed with pre-existing rectilinear vision models. This is much easier and cheaper than re-training a computer vision model with lens specific images (e.g., fisheye and/or anamorphic images).

DETAILED DESCRIPTION

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

Anamorphic Lenses: Optical "Squeeze" and Lens Flare

Conventional wisdom suggests that for a camera to create images that appear "natural" to human vision, it must use a "normal focal length". The ideal normal focal length mathematically models the perspective from a point at a "normal viewing distance". Conceptually, this model may be visualized as holding a photograph at arm's length that would have an indistinguishable perspective when viewed with one eye shut. Mathematically, the ideal normal lens has an angle of view that is close to one radian (~57.2958°) of the image circle.

Most camera lenses are "spherical" or otherwise radially symmetric. However, there are a variety of radially "asymmetric" camera lenses that are used in niche photography. As one such example, cylindrical "anamorphic" lenses were originally developed for use in cinema and are still commonly used in filmmaking today, particularly in widescreen epics and action movies. They are known for their distinctive visual style and are often used to artistically create a sense of drama and spectacle.

Figure 1:
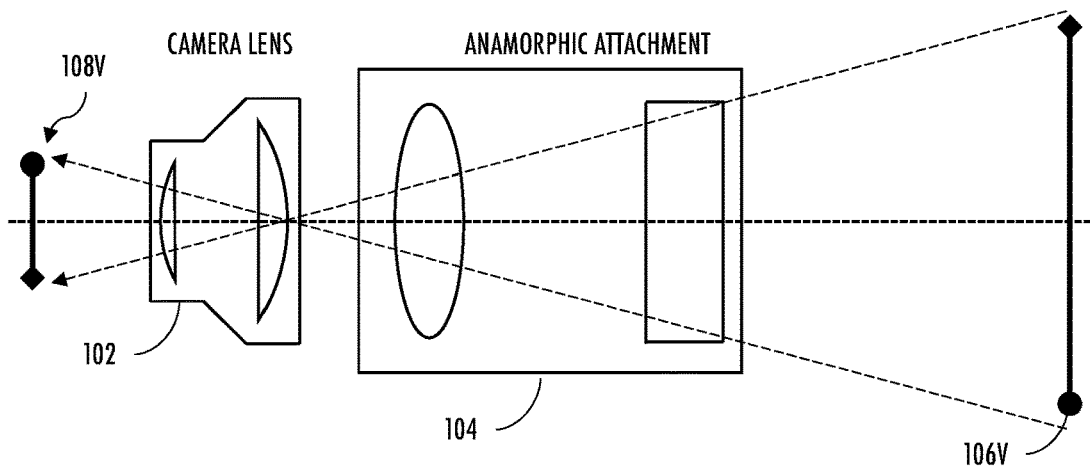
FIG. 1 is a graphical representation of an anamorphic camera attachment.
Figure 1:
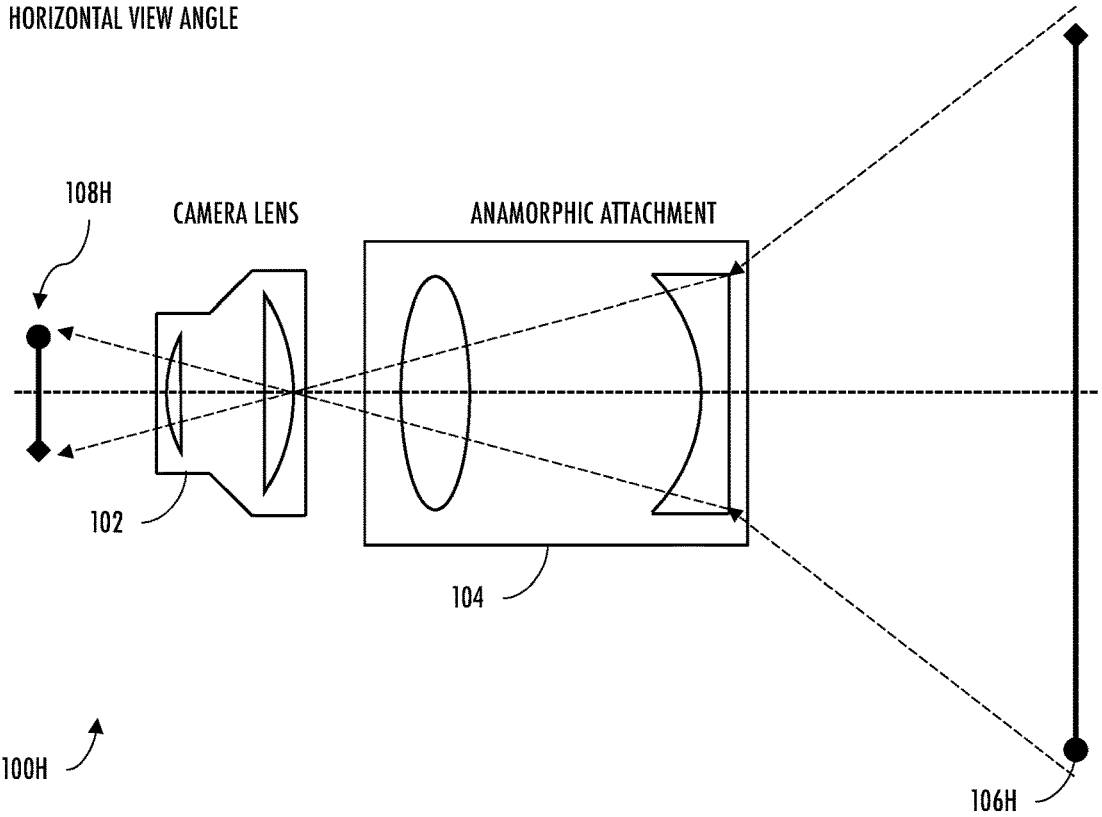

FIG. 1 is a graphical representation of a horizontal view angle 100H and vertical view angle 100V of a camera lens 102 and anamorphic attachment 104, useful to illustrate the various aspects of the present disclosure. The anamorphic lens is shaped such that the lens behavior in the vertical axis is different than the horizontal axis. In the illustrated example, the vertical field-of-view (FOV) is normal, but the horizontal FOV is greatly widened. For example, a subject having a horizontal dimension 106H and vertical dimension 106V is captured as with a horizontal dimension 108H and vertical dimension 108V. This difference in magnification (also referred to as "squeeze") may be expressed as a ratio of a first magnification relative to a second magnification; thus, for example, a 2:1 anamorphic squeeze provides twice as much horizontal magnification as vertical magnification. Different anamorphic lenses provide different squeeze ratios, however, 2:1 lenses and 1.33:1 lenses are most popularly used in cinematography since they are associated with specific film formats, visual effects, and aesthetic styles.

Figure 2:
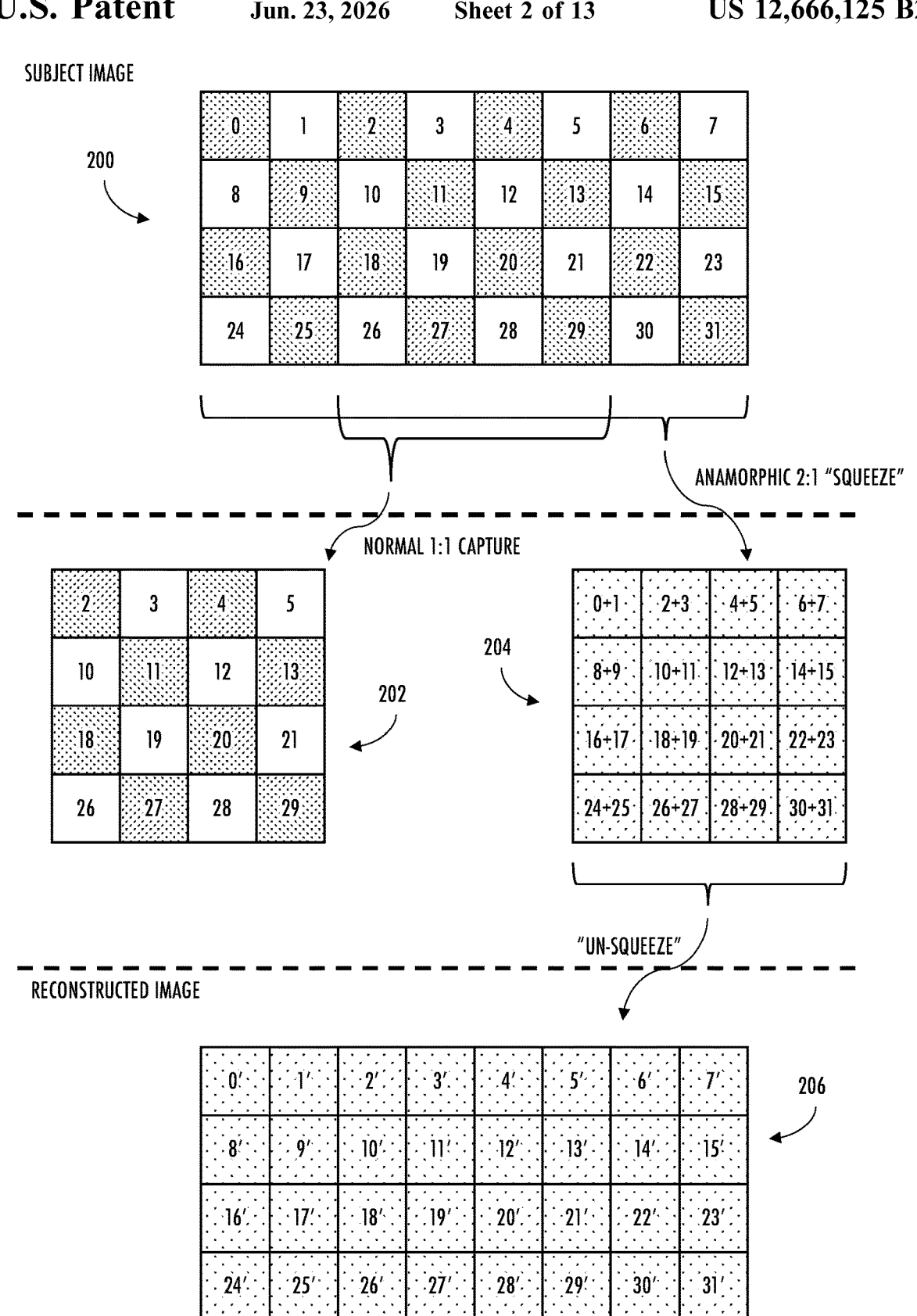
FIG. 2 is a graphical representation of a subject image captured with normal and anamorphic lenses.

Anamorphic lenses were originally used with traditionally exposed film, however most modern cameras are digital. The combination of optical squeeze with digital sensors can introduce some image artifacts. FIG. 2 is a graphical representation of a subject image 200 that is represented with 16 pixels arranged in four (4) rows of four (4). Artisans of ordinary skill in the related arts will readily appreciate that the 16-pixel example is greatly simplified for ease of explanation-most images have millions of pixels.

In the illustrated example, the subject image 200 is represented as a 4×8 grid of numbers (e.g., squares 0-31). When used with a normal 1:1 aspect ratio lens, the camera captures only a subset image 202 of the subject image 200 (the subset image only includes squares 2-5, 10-13, etc.). When used with an anamorphic 2:1 lens, the camera captures the subject image 200. However, the anamorphic lens squeezes the light information from two squares into a single pixel value (e.g., the first pixel of the first row has squares 0+1, 2+3, etc.). Conceptually, the optical compression occurs at a first aspect ratio (2:1) but the light information is represented (with loss of fidelity) as a pixel with a different aspect ratio (1:1). The anamorphic lens also alters exposure characteristics, thus an anamorphic capture might e.g., change shutter speed, ISO, etc. to capture the same exposure (e.g., frame brightness) as a spherical lens.

If desired, additional post-processing can be used to decompress ("un-squeeze") the anamorphic image into a reconstructed image 206. Typically, such post-processing is based on linear interpolation (or higher-order polynomial interpolation). For example, the light information for squares 2' and 3' are linearly interpolated from a single pixel value (2+3) of the anamorphic capture 204. The linearly interpolated process reconstructs pixels from the anamorphic pixel values (with lost fidelity) and also adds smoothing. Thus, for example, the reconstructed squares 2' and 3' are likely to differ from originally captured data, such as squares 2, 3 of the subset image 202. More directly, unsqueezing the anamorphic image cannot recover the lost information (signal); it only adds noise information that is palatable for humans.

As a related tangent, while anamorphic lenses preserve the "straightness" of lines, they do affect the major and minor axis differently at different focal lengths. The cylindrical shape of the lens causes the image to be squeezed or stretched along the horizontal axis, based on distance from the lens. This can lead to the appearance of objects changing shape or size at different rates as they move closer or further away from the camera. This effect is occasionally also referred to as "breathing"—and it can be particularly noticeable in shots that include objects with straight lines or circles, such as buildings or car wheels. This effect also means that most anamorphic lenses are not truly rectilinear because they do not preserve perspective. While it is possible to combine other lenses and carefully control subject distance to create nearly rectilinear behavior—this is difficult to orchestrate and expensive to "shoot"; thus, it is only found in controlled studio environments.

As used herein, the term "anamorphic" refers to any lens that has different magnification (or minification) properties in one or more axis of the lens. For reasons that will become clear below, the axis with more magnification is referred to throughout as the "major" axis; the axis with less magnification (or more minification) is referred to throughout as the "minor" axis. For example, a 2:1 anamorphic lens provides 2× magnification along the major axis, relative to the minor axis.

In addition to the asymmetric magnification, anamorphic lenses introduce unique visual artifacts. As but one such example, spherical lenses have a symmetric focal length in both axis, anamorphic lenses blur at different distances across the major axis. This property can be used to create an oval "bokeh" effect (e.g., blurring of the foreground and background relative to the subject of the image), fall-off, and/or focus roll-off. Similarly, anamorphic optics are perceived as blurring the background, yet objects that are close to the camera are magnified; this is interpreted by human perception as a very shallow depth of field. Rather than symmetrically-shaped optical flares (stars, etc.), anamorphic flares are usually dominated by long streaky flares in the major axis of the lens. Additionally, while most spherical lenses "zoom" slightly with change in focus; anamorphic lenses change their squeeze and/or asymmetrically "breathe" during zoom.

As an unrelated but important note, there are some wide field-of-view (FOV) computer vision applications. For example, some self-driving cars use fisheye cameras to capture the surroundings of the vehicle. Unfortunately, however, the "barrel" distortion of fisheye lenses present significant challenges for computer vision models trained on rectilinear images. It is often too expensive and difficult to re-train computer vision models with non-rectilinear training libraries. Instead, most implementations subdivide wide FOV images into smaller portions which can be converted to rectilinear images for use with existing computer vision libraries. In other cases, multiple narrow FOV cameras can be used with existing computer vision models in isolation.

Anamorphic lenses have not been explored in computer-vision applications to any significant degree (if at all). The effects that are introduced by anamorphic lenses have historical context in cinematography. These effects are now purposefully introduced into cinematic footage, in some cases manually, for artistic reasons. However, the unique distortions and dynamic effects of these lenses are unlike symmetric spherical lens flares and would require re-training. As a further complication, the asymmetric nature of anamorphic lenses means that their optical properties change based on orientation; conventional wisdom suggests that this would present unwanted complications for situations where the lens is in an arbitrary orientation (e.g., where camera lenses may be jostled, or used in off-kilter positioning). Finally, since the bulk of anamorphic photography is intentionally created for cinema, there has not been much (if any) commercial incentive to create computer vision models for e.g., artifact correction, object recognition, etc.

Phase Detection Autofocus and Non-Square Photosites

Switching now to a wholly separate field of arts, digital cameras use a lens assembly to focus light onto a sensor component. Most camera sensors include multiple layers of color filters, microlenses, and an array of photosites. The raw data is additionally processed (also referred to as "developed") via an image signal processor (ISP) to create a two-dimensional 2D array of pixel information that represents the captured image. While "pixels" are assumed to be "square" for ease of representation as a 2D array, the underlying camera mechanisms for light capture may not be (and often are not) square.

Figure 3:
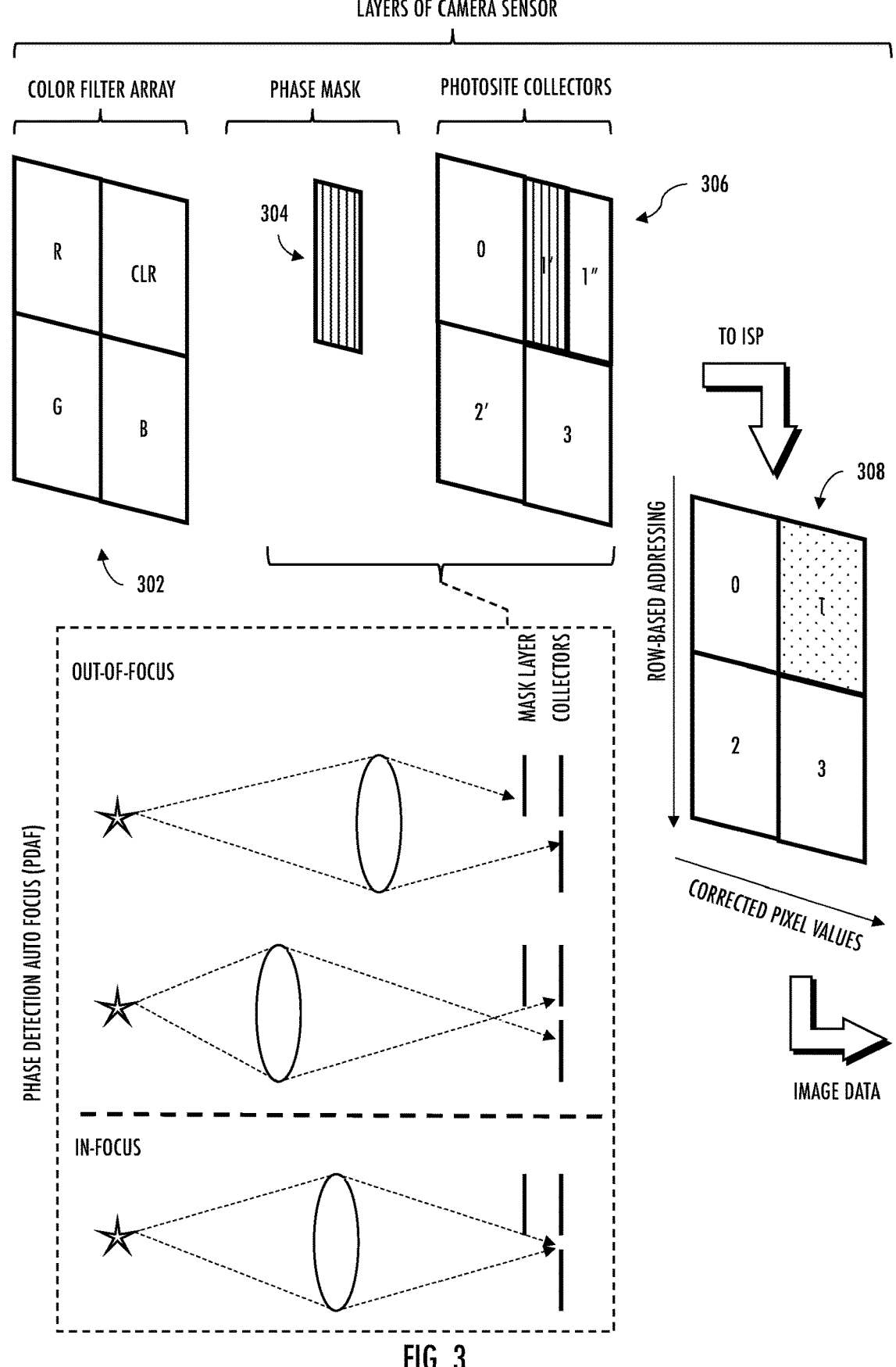
FIG. 3 is a graphical representation of phase detection autofocus (PDAF) operation.

As but one such example, so-called phase detection autofocus (PDAF) is commonly found in many digital cameras and smartphones. FIG. 3 is a graphical representation of PDAF operation. As shown, the exemplary PDAF-enabled camera sensor includes a color filter array 302, a phase mask 304, and photosite collectors 306. In the illustrated example, the color filter array also functions as a microlens array; other implementations may have these as separate components.

During operation, incoming light is focused as it passes through the color filter array 302. Each filter of the color filter array 302 only passes certain wavelengths of light (e.g., "R" passes red light, "G" passes green light, "B" passes blue light). However, some locations are not color filtered (i.e., "CLR" is clear and passes all photons). The unfiltered light is passed through a phase mask 304 instead. Each phase mask physically masks half of the focused light, such that only light corresponding to one side of the microlens is passed.

The photosite collectors 306 collect photons to determine the amount of light that is captured. The total number of photons can be used to determine the intensity of colored light or, in the case of PDAF, used to infer focal distance.

In the illustrated example, photosite collector 1 is split into a "dual photosite collector" (1' and 1"); the left collector (1') is masked, the right collector (1") is unmasked. The dual photosite collector collects "phase difference" that may be used to infer how to move the lens into focus. Specifically, if the focal point is behind the collectors, then some portion of the light will not be gathered; as shown, the left-collector corresponding to the right-mask will collect fewer photons than expected. Conversely, if the focal point is in front of the collectors, then the light will "bleed" across the split. In other words, the right-collector behind the right-mask will collect photons (even though it should be masked). When the lens is perfectly in-focus, the focal point will be at the surface of the photosite collector. Consequently, the photosite collectors should have the expected number of collected photons (i.e., about half the photons of other collectors) and the masked portions should not receive any photons.

The photosite collector information is used by the image signal processor (ISP) to generate the resulting corrected pixel values 308. The ISP does perform some amount of image correction to compensate for PDAF sensors. As shown, PDAF reduces the amount of collected photons since some amount is masked off. Additionally, PDAF sensors are clear rather than color filtered, thus some amount of color information is also lost. For reference, a typical "Bayer" filter has two green filters for every red and blue filter. This is important because the human visual system is especially sensitive to green light. In this case, the missing green filter, if left unadjusted, might result in a less vibrant pixel. ISP corrections may include interpolation/extrapolation based on neighboring pixel information and/or other signal filtering.

Finally, the ISP presents the resulting image data structure in the format that is most efficient for display devices. In most implementations, this means that the image data is stored as a two-dimensional array of pixel values but read out using row-based addressing for each "scan line". Each scan line can be read out as one-dimensional array of pixel values. In this scenario, row-based addressing allows for more efficient access because there are fewer rows than columns and/or rows have more values than columns. In other words, row-addressing requires less overhead (smaller row addresses) for more data (larger row sizes). Since most imaging media is wider than tall (e.g., 4:3, 16:9, etc.) row-based addressing is the de facto standard for imaging devices.

While only one dual photosite collector is discussed above, PDAF uses pairs of photosites that are alternatively masked across the entire sensor to determine the lens adjustment (e.g., each left masked photosite is paired to a right masked photosite). The density of PDAF sensors determines the speed of autofocus; increasing the percentage of PDAF sensors provides diminishing returns in terms of speed and accuracy. Thus, most cameras only use dual photosite collector structures in about 10% of the total pixels.

The foregoing discussion of PDAF sensors offers a few very important observations. First, the physical structures (photosites) that collect light can have very different aspect ratios from the resulting pixels. Second, row-based addressing is optimized for display technologies (rather than the underlying collector geometry).

Anamorphic Lenses in Smart Glasses

Recently, "smart glasses" have garnered significant consumer interest. Smart glasses attempt to incorporate computer vision processing capabilities in an eyeglass form factor; for example, most implementations of smart glasses use cameras to capture images of the external world, and a heads-up display to provide information to the user.

Conceptually, eyewear has multiple salient distinctions over other personal effects; by extension, these distinctions may be leveraged by smart glasses in much more intuitive ways compared to other handheld devices and wearables. Firstly, eyewear is worn on the head whereas most other devices may be used with any arbitrary orientation relative to the user's body. For example, a user may switch hands to hold their phone or place it on a table during use. In contrast, once donned, handling eyewear of any kind is generally undesirable (e.g., to avoid scratches and/or smudging). Additionally, eyewear is consistently worn in a physically precise location relative to the user's face e.g., eyes, ears, and mouth. Head movement is also generally much more stable and deliberate relative to other body motion, even during strenuous activity. Hand-eye coordination and proprioception are also basic physical skills that most capable adults possess. For example, many people can instinctively "point at a target" with great accuracy by aligning their outstretched index finger and their dominant eye to the target.

Some attempts have been made to implement augmented reality (AR)/extended reality (XR) user interface processing with smart glasses. Typically, such implementations overlay the user interface with a virtualized representation of a digital object. For example, smart glasses may be configured to render virtual keyboards and virtual pointing devices and recognize hand-based interactions with the real environment and/or virtualized devices. A user may "type" on a virtualized keyboard to annotate notes about an object in the real world. Notably, however, existing smart glasses cameras must preserve rectilinearity both for the user's seamless perception of AR/XR, but also for any computer vision models.

Figure 4:
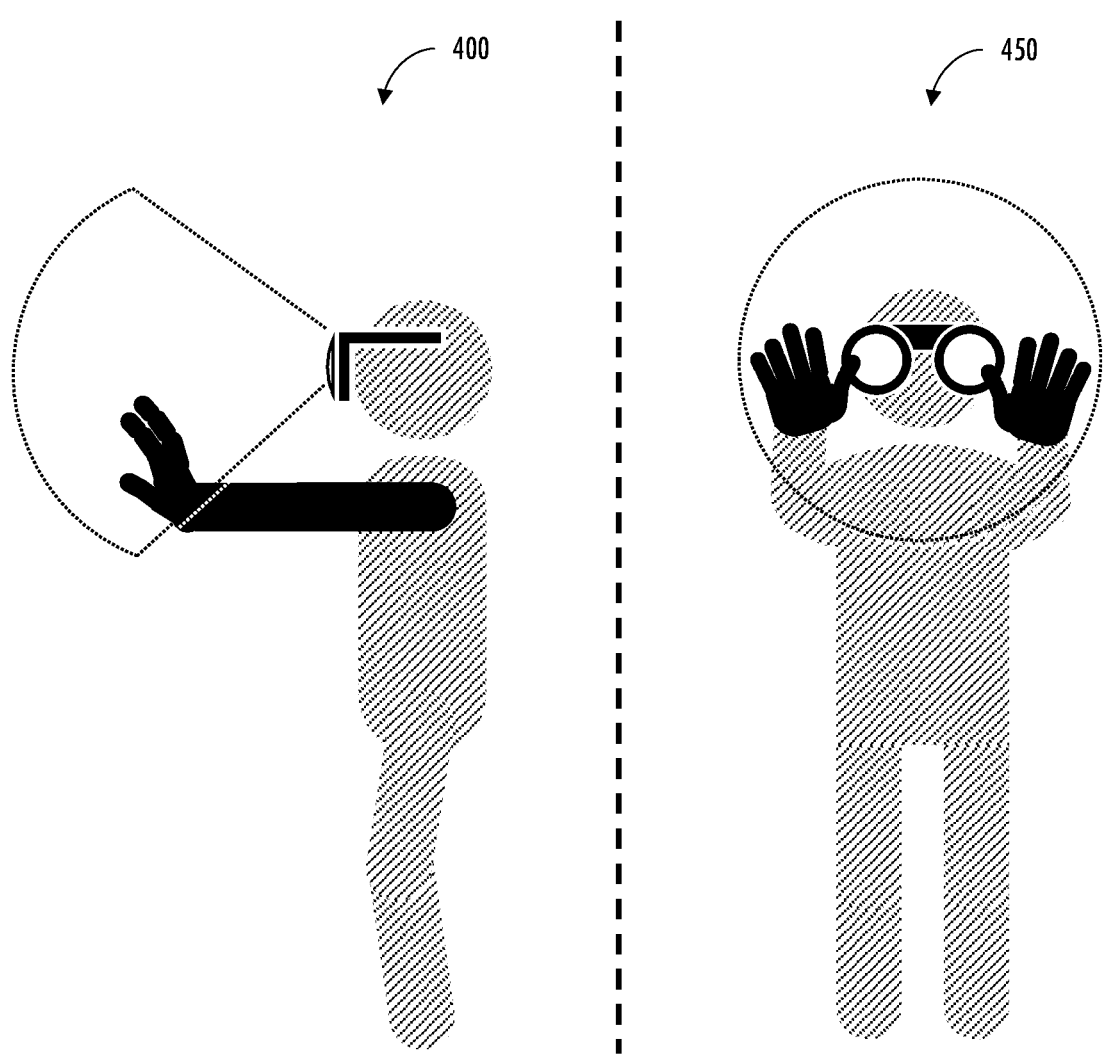
FIG. 4 is a graphical representation of a side-facing view and forward-facing view of a person interacting with virtual objects that are captured by the ideal normal lens.

FIG. 4 depicts a side-facing view 400 and forward-facing view 450 of a person interacting with virtual objects that are captured by the ideal normal lens. As shown, the ideal normal lens field-of-view (FOV), when forward-mounted on the head, only begins to capture the user's hands when they are nearly fully outstretched extending nearly parallel from the shoulders. This "zombie hands" posture is both uncomfortable and awkward. Market research suggests that smart glasses must provide substantial utility over the course of a day in a convenient and comfortable manner; thus, these ergonomic considerations must be addressed.

A variety of different solutions have been proposed. For example, some smart glasses manufacturers have attempted to combine the FOVs of multiple cameras (e.g., 6 or even 8 cameras). Unfortunately, adding multiple cameras greatly affects the industrial design constraints of smart glasses (e.g., power consumption, processing capability, memory space, etc.). Also, the cameras must be tilted to cover different angular regions; parallax and angular offset must be removed during stitching to provide a cohesive panoramic image. Furthermore, the set of cameras must be coordinated to capture at similar times and with similar exposure settings, to enable stitching. Coordination, stitching, angular compensation, and parallax compensation are all processing intensive tasks.

Other proposed solutions have attempted to use wider FOV cameras (e.g., fisheye lenses). However, fisheye lenses have other issues. Fisheye images require special training and/or more compute-intensive processing for computer vision models to compensate for straightness and motion that are distorted by the lens. Removing fisheye distortion adds pipeline delay and also may introduce noise, particularly at the edges where there are fewer available pixels for objects (relative to a centered image of the same object, at the same distance). Fisheye lenses are also more susceptible to vignetting which can affect light information.

Example Operation, Ergonomic Hand Positioning for Gestures

In one exemplary embodiment, anamorphic lenses are used in combination with computer vision models to capture user interactions. In one specific implementation, the anamorphic lenses are oriented such that the major axis runs vertically (rather than horizontally). Within this context, "rows" are horizontal (read from left to right), and "columns" are vertical (read from top to bottom); however, unlike conventional horizontal anamorphic orientations, the rows are shorter than the columns. For example, an anamorphic lens with a 2:1 squeeze would capture columns that are twice as long as the rows.

Figure 5:
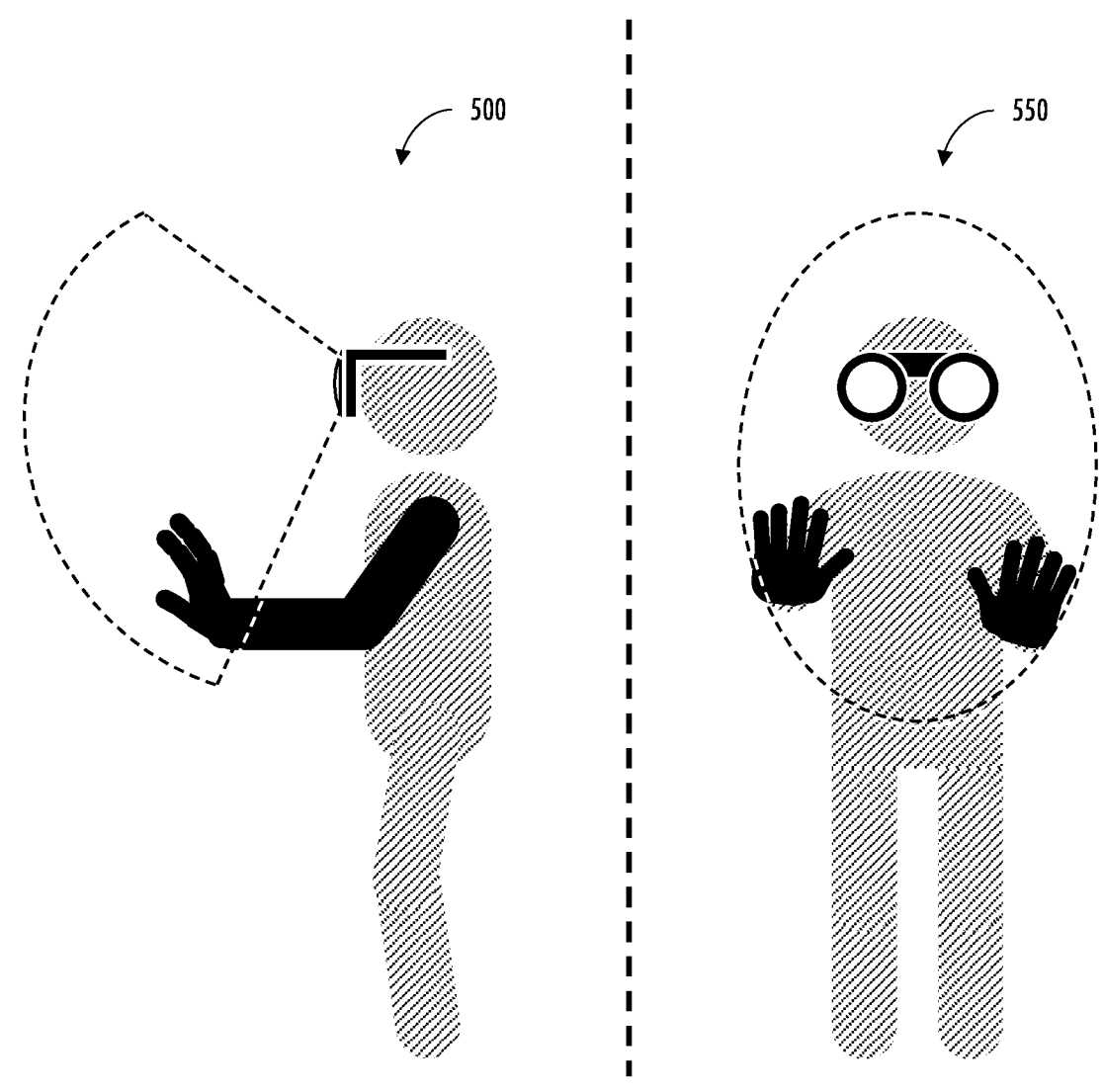
FIG. 5 is a graphical representation of a side-facing view and forward-facing view of a person interacting with virtual objects that are captured by an anamorphic lens, in accordance with various aspects of the present disclosure.

FIG. 5 depicts a side-facing view 500 and forward-facing view 550 of a person interacting with virtual objects that are captured by the anamorphic lenses. As shown, the vertically oriented anamorphic lens field-of-view (FOV), can capture the user's hands at a lower positioning; this may enable the user to gesticulate in a more comfortable position. Additionally, in some applications, the user may rest their arms on a surface (e.g., a desk or counter) while gesturing; this may be particularly useful for applications where the user's eyes are directed forward rather than at their hands. By de-coupling the user's gaze from their hands, the smart glasses can enable applications with proprioception (the user's sense of their own limb positioning in space). This may be particularly important for tasks such as e.g., touch-typing with a virtualized keyboard and/or pointer movement with a virtualized mouse.

Furthermore, while anamorphic lenses may not preserve the perspective of rectilinearity, anamorphic lenses do preserve straightness of motion and lines (i.e., "linearity"). As a practical matter, existing computer vision models can be used with anamorphic images without re-training or intermediate conversion steps (unlike fisheye lenses). In fact, some optimized variants may directly provide the raw anamorphic image data to the computer vision pipeline (rather than the post-ISP pixel data). Skipping the ISP may reduce power consumption and shorten the overall latency. This may be particularly important for real-time applications (e.g., AR/XR, eye-tracking, and/or gesture detection), where "time-to-inference" is an important metric. Furthermore, freeing up more time in the computer vision processing pipeline may also provide opportunities for additional layers of neural network processing and/or other processing.

More generally, the contents of the present disclosure provide substantial improvements for applications that have different FOV requirements along different axes. While the present disclosure is discussed with reference to smart glasses, the techniques may be similarly applied to e.g., smart doorbells, surveillance cameras, self-driving cars, etc. Currently, fisheye lenses are often used in these applications to maximize FOV in both vertical and horizontal axis; however, a wider FOV in only one axis might be sufficient. For example, conventional smart doorbells use a fisheye camera to maximize their FOV; however, a significant portion of the sensor may capture the ground and sky. The smart doorbell might be better served with an anamorphic lens using a wide FOV in the horizontal axis only. Similarly, a conventional self-driving car might use fisheye lenses to sense its immediate perimeter to prevent collisions-however, the on-board computer vision logic might pre-process the fisheye images to rectilinear images for its computer vision model. In these cases, an anamorphic camera might be better suited for computer vision models to e.g., estimate the position and motion of an object. Other such applications may be readily substituted with equal success.

Figure 6:
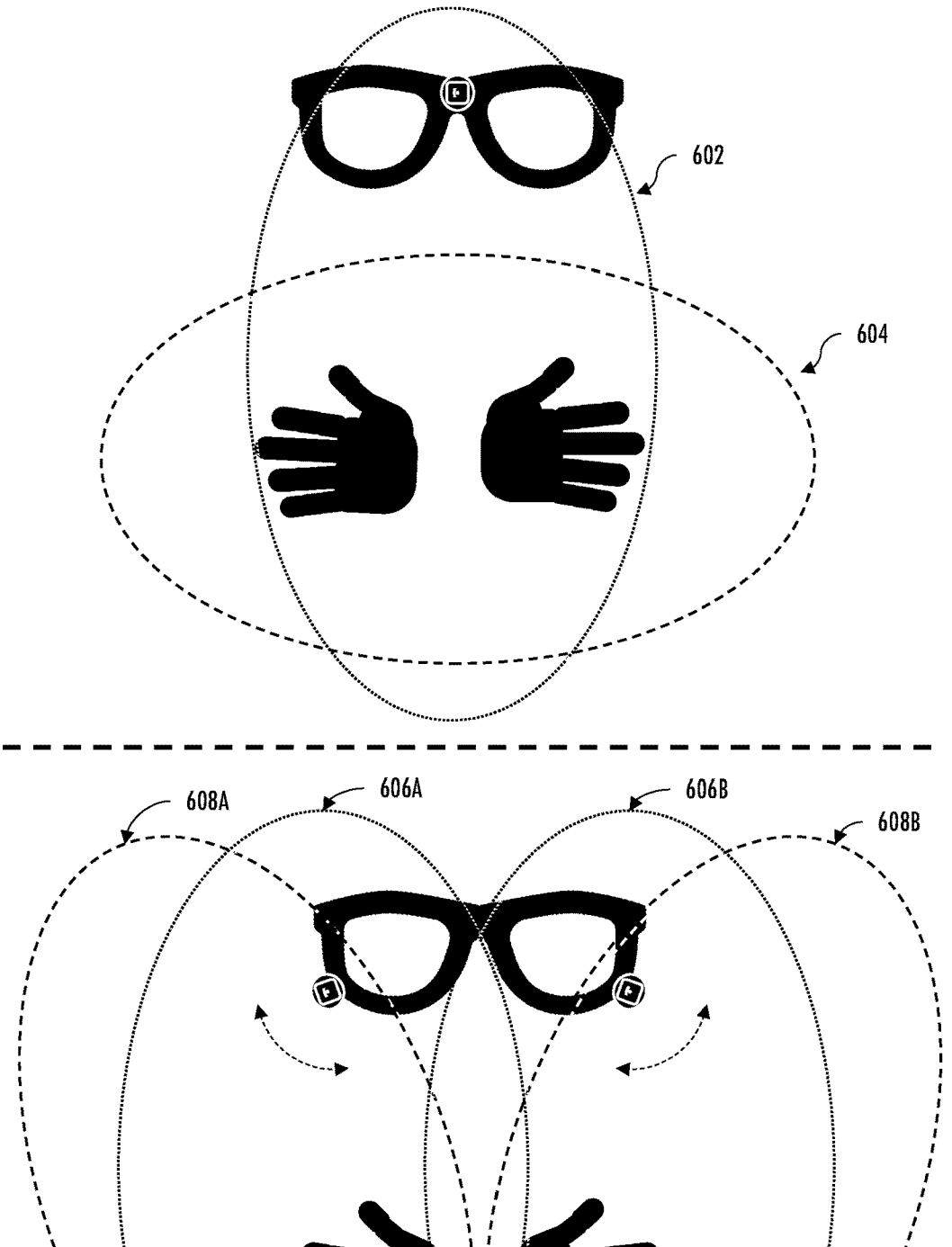
FIG. 6 illustrates multiple different variations of placement and orientation for an anamorphic camera, in accordance with various aspects of the present disclosure.

While FIG. 5 shows a single anamorphic camera in a specific orientation, any number of anamorphic cameras in a variety of different orientations may be substituted with equal success. FIG. 6 illustrates multiple different variations of placement and orientation. In some embodiments, a single anamorphic camera may be oriented with a vertical major axis; this orientation encompasses the user's resting gaze while also capturing hand movements (represented by FOV 602). In some embodiments, a single anamorphic camera may be oriented with a horizontal major axis, to only capture hand movements (represented by FOV 604). In some cases, two anamorphic cameras may be used to provide hand-specific coverage. For example, right and left anamorphic cameras may be oriented with a vertical major axis, to match the user's resting gaze while also capturing each hand's movements separately (represented by FOV 606A, FOV 606B). Other implementations might use oblique angles that may be more comfortable for some users (represented by FOV 608A, FOV 608B).

While the two cameras are shown with a mirrored rotation and tilt, independent rotation and tilt may be used to e.g., accommodate hand dominance (e.g., right-handed or left-handed users) and/or the usable FOV of the hands. More generally, unlike spherical lenses which are characterized by symmetric FOV in both axes, anamorphic lenses have optical differences between the major and minor axis. Thus, the axis orientation may be adjusted in any of the three rotational dimensions (yaw, roll, and pitch), relative to the user's resting gaze and/or hand positioning.

Various embodiments of the present disclosure may combine anamorphic cameras with a gesture-based user interface. For example, as described in U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,257 filed Dec. 2, 2022, and entitled "SYSTEMS, APPARATUS, AND METHODS FOR GESTURE-BASED AUGMENTED REALITY, EXTENDED REALITY", previously incorporated by reference above, a variety of different hand gestures may be used in combination with gaze information to provide a gesture-based augmented reality and/or extended reality (AR/XR) user interface. In one specific implementation, a vertically oriented anamorphic camera can capture hand motions that are distinct from, but related to, the subject of the user's gaze. Thus, for example, a user might gaze at a QR code posted on a wall to view a virtual menu, while the hands are used in a comfortable position (propped on a table, etc.) to virtually scroll and/or flip between pages. As another example, a person might look at a computer screen and "touch type" or use a virtual mouse on their desk surface. Various other applications may be substituted with equal success by artisans of ordinary skill in the related arts.

Various embodiments of the present disclosure may combine anamorphic cameras with other cameras assemblies. For example, as described in U.S. patent application Ser. No. 18/185,362 filed Mar. 16, 2023, and entitled "APPARATUS AND METHODS FOR AUGMENTING VISION WITH REGION-OF-INTEREST BASED PROCESSING", U.S. patent application Ser. No. 18/185,364 filed Mar. 16, 2023, and entitled "APPARATUS AND METHODS FOR AUGMENTING VISION WITH REGION-OF-INTEREST BASED PROCESSING", and U.S. patent application Ser. No. 18/185,366 filed Mar. 16, 2023, and entitled "APPARATUS AND METHODS FOR AUGMENTING VISION WITH REGION-OF-INTEREST BASED PROCESSING", each of the foregoing previously incorporated above, a smart glasses apparatus may include multiple different camera modules to support a variety of different applications. For example, a telephoto camera assembly may provide long distance vision and a fisheye camera assembly might provide computer-assisted search. These capabilities may be augmented with an anamorphic camera that is focused on the user's hand gestures to allow for natural user interface gestures, etc. Still other applications may be substituted with equal success by artisans of ordinary skill in the related arts.

Notable Optimizations Using Non-Square Photosites

Figure 7:
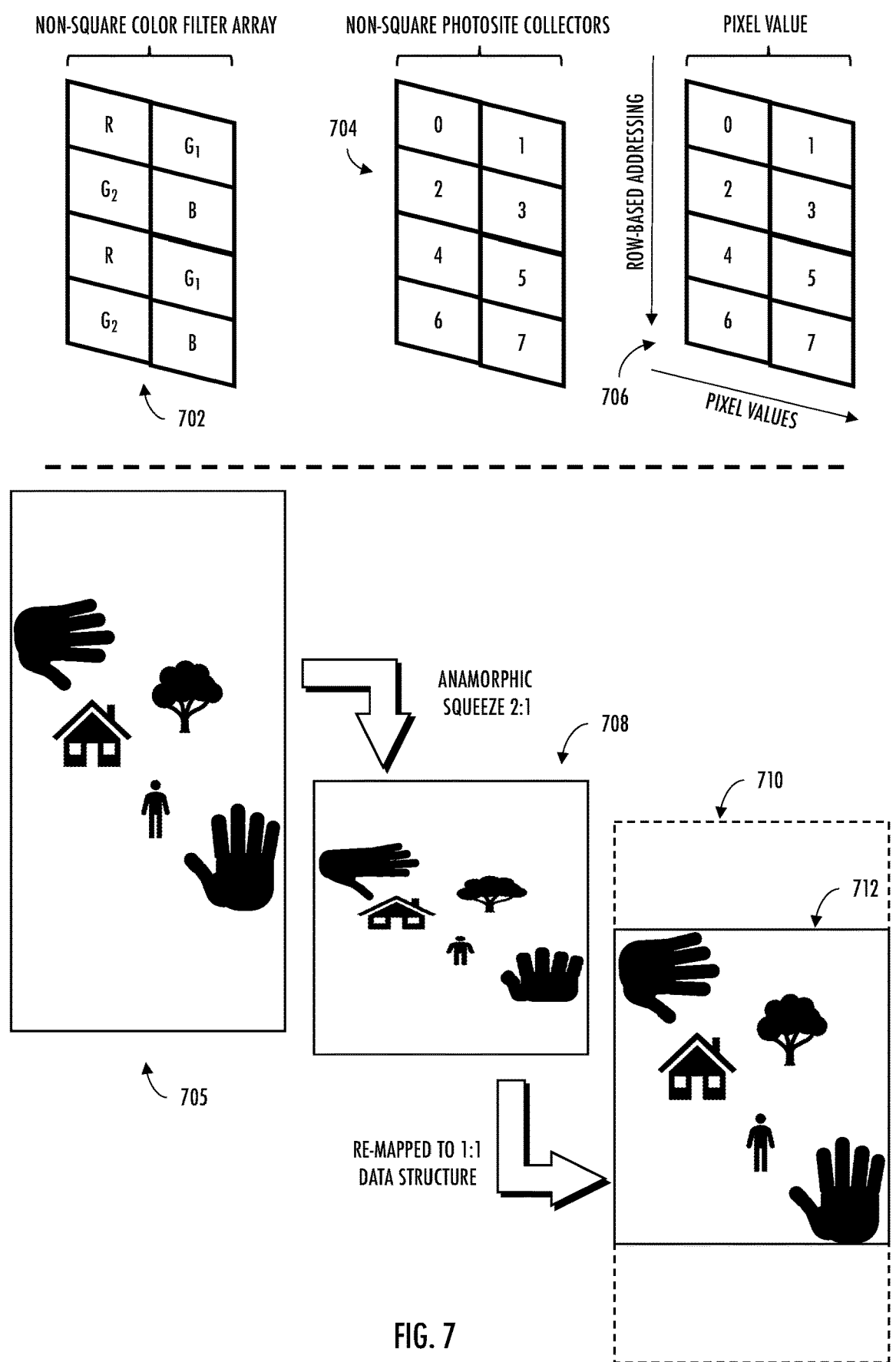
FIG. 7 is a graphical representation of non-square photosite binning, useful in conjunction with various aspects of the present disclosure.

As previously discussed, existing sensor manufacturers already have the capability to manufacture non-square sensor components (e.g., Phase Detect Autofocus and Non-So are Photosites). Thus, one exemplary variant may additionally couple the anamorphic lens to e.g., a non-square color filter array 702 and/or non-square photosite collectors 704 which can then be digitally mapped to pixel values 706 (such as is shown in FIG. 7).

During operation, the anamorphic lens captures a subject image 705 composed of pixel values 706 with an anamorphic lens. As previously noted, the light information is optically squeezed; in this case, the anamorphic lens provides a 2:1 ratio. Thus, the length of the captured image 708 has been halved along its major axis. The camera sensor uses the reciprocal aspect ratio for the non-square color filter array 702 and/or non-square photosite collectors 704 to capture the light information. In the illustrated example, the filters of the non-square color filter array 702 and non-square photosite collectors 704 are rectangles that are twice as wide as they are tall (i.e., 1:2 aspect ratio). The raw data from the non-square photosite collectors 704 is "developed" via the image signal processor (ISP) to create a two-dimensional 2D array of pixel information that represents the captured image. Notably, the reciprocal relationship between the optical squeeze (2:1) and the non-square sensor components (1:2) results in a "square" pixel (1:1); e.g., the resulting pixels can be displayed and processed in conventional components without stretching or shrinking.

More directly, conventional anamorphic photography uses anamorphic attachments with conventional cameras (as illustrated above with respect to FIG. 1). However, the camera has an internal image processing pipeline that is based on "normal" images (i.e., non-anamorphic images). During operation, the anamorphic lens squeezes non-square light information onto a single square pixel; since pixel quantization is a lossy process, any attempts to reconstruct the original light information can only add noise (approximations/estimations, etc.). In contrast, the exemplary system described above uses non-square photosites to collect non-square light information from the anamorphic lens; this enables a reciprocal mapping of the non-square photosites to square pixels. In other words, the resulting pixel information preserves the originally captured light information (signal).

The techniques described throughout may be broadly extended to any reciprocal relationship between the optical lens and the non-square color filter array and/or non-square photosite collectors. For instance, a 1.33:1 anamorphic lens (mathematically equivalent to a 4:3 aspect ratio) might be paired with photosite collectors that have a 1:1.33 (or 3:4 aspect ratio), etc. While the foregoing examples are presented in terms of the most common anamorphic lenses, other aspect ratios may be substituted with equal success.

Additionally, while the foregoing techniques rely on the physical aspect ratio of the non-square components to "un-squeeze" the optically squeezed light information, other implementations may use processing within the image signal processor (ISP) to perform the un-squeeze. As a brief aside, so-called "pixel binning" allows a camera sensor to bin together light information from multiple pixels to create "binned pixels". Typically, pixel binning is used to group light information from multiple pixels into a single binned pixel value to compensate for low-light. For example, a nona-binned pixel combines the light information from nine pixels (3×3) into a single binned pixel, allowing a 108MPixel camera sensor to provide 12MPixels in low light.

By extension, non-square "photosite binning" could be set with a reciprocal relationship to the optical squeeze. For example, a 2:1 anamorphic lens might be paired with photosite binning according to a 1:2 ratio. As another example, a 1.33:1 anamorphic lens (mathematically equivalent to a 4:3 aspect ratio) might be paired with twelve-binning photosites (3×4, providing a 3:4 aspect ratio), etc.

As a brief aside, image quality may be reduced for certain types of computer vision applications; computer vision models can be trained to e.g., detect objects and/or recognize objects using smaller data structures and/or unusual dimensions. In some variants, photosite binning may be selectively chosen to offer different un-squeeze factors. For example, photosites with an aspect ratio of 1:6 could be left unbinned resulting in a 6:1 un-squeeze. However, 2-photosite binning would provide a 3:1 un-squeeze, 3-photosite binning would provide a 2:1 un-squeeze, and 4-photosite binning would provide a 1.5:1 un-squeeze. Different un-squeeze factors change the dimensions of the resulting image, this may enable smaller transfer sizes and/or reduced downstream processing.

While the present discussion is not shown with PDAF, the structures described above may be modified to support PDAF operation. In one such variant, a non-square photosite may be replaced with a dual photosite collector (and corresponding clear filter and phase mask). For example, a 1:2 "narrow" photosite may be split in half lengthwise to yield two PDAF photosite collectors with a 1:1 aspect ratio. Alternatively, the 1:2 "narrow" photosite may be split in half widthwise to yield two PDAF photosite collectors with a 1:4 aspect ratio. In yet other implementations, PDAF may be implemented using binning techniques and ISP software to combine two vertically adjacent non-square photosite collectors (e.g., 0 and 2, 1 and 3, etc.) into a single PDAF sensor.

Notable Optimization, Row-Based Addressing

As previously alluded to, image processing pipelines have historically used row-based addressing since displays typically have more columns than rows (i.e., row-based addressing requires less overhead (smaller row addresses) for more data (larger row sizes)). Some attempts have been made to combine row-based addressing with region-of-interest (ROI) processing; the efficiency improvement is a function of the number of rows that are read or transferred. Thus, an object that is ~10% of the image height could be transferred at ~10% of the entire cost. In most implementations, the ROI is determined based on motion detection in the image, e.g., a video of an object moving against a background might be able to reduce (or altogether ignore) rows that only had non-moving background image information. Within the context of the present disclosure, vertically oriented anamorphic images have columns that are larger than the rows (e.g., for a 2:1 squeeze, the columns are twice as long as the rows). Thus, conventional wisdom would suggest that column-based addressing would be preferred (smaller column addresses, larger column sizes) absent other considerations.

As a separate but important tangent, smart glasses can monitor user interactions in ways that were not previously possible. For example, smart glasses may monitor eye-tracking and/or capture hand gestures. Head movement (and eye-movement, in particular) is highly indicative of attention, regardless of task or motion. Current vision research suggests that eye movement is closely tied to the human thought processes; and, by extension, human thoughts may be inferred from eye movement. Additionally, smart glasses enable "hands free" operation, allowing users to gesture and/or gesticulate with one or both hands. Some smart glasses applications may enable e.g., gesture-based user interface interactions with augmented reality and/or extended reality (AR/VR) objects.

Conceptually, the aforementioned ergonomic separation between the user's hands and the user's gaze point means that these distinct areas may be separately monitored or jointly monitored. For example, the user's resting gaze is likely to be in a different set of rows than the ergonomic hand positioning (see e.g., FIG. 5); thus, certain applications may only require one set of rows. In other examples, only the area of the user's gaze in combination with hand positioning is of interest (see e.g., FIG. 7); unrelated rows may be ignored. In other words, the nature of the user interaction data may be used to selectively address different portions of the anamorphic image data.

Exemplary embodiments of the present disclosure combine row-based addressing for squeezed rows with region-of-interest processing based on user interactions. Importantly, an object that would normally be ~10% of the image height with a normal lens, would be optically squeezed to only ~5% of the rows. In other words, row-based addressing for vertically squeezed images benefits from both the optical squeeze and the reduction in the number of rows being read or transferred. More generally, the techniques may be broadly extended to any addressing scheme that occurs in the same axis as the optical squeeze. For example, a horizontally oriented anamorphic squeeze could be combined with column-based addressing scheme to provide similar benefits (such as is described in greater detail below, Example Operation, Robust Eye-Tracking).

As shown in FIG. 7, the anamorphic lens captures a subject image 705 with an anamorphic lens; light information is optically squeezed to create captured image 708. However, rather than using the entire anamorphic image 710, only the portion 712 that has identified user interactions is needed. In this example, the portion 712 is a shared ROI that encompasses the user's gaze point and both hands however, the techniques may be broadly extended to any number of ROIs. For example, a user's gaze point and each hand may have its own distinct ROI. In some cases, the ROIs may be shared between either/both hands and/or the gaze point.

As previously noted, each ROI is associated with a set of rows. For reference, a user's hand might only take 5% of the rows of the anamorphic image (10% without an anamorphic squeeze). The gaze point ROI is likely to be smaller; depending on the size of a subject of interest, the gaze point ROI might be as small as 1% of the rows of the anamorphic image. In some variants, unused columns of the row-based data may additionally be trimmed to focus on just the ROI. The columns are at a normal aspect ratio, thus, a user's hand might comprise 10% of the columns. In total, the ROI for a hand might be as small as 0.5% of the total captured image size (e.g., 5% by 10%); a gaze point could be only 0.02% (e.g., 1% by 2%). Minimizing data transfers at the sensor greatly improves downstream efficiency (e.g., less data is transferred and processed) and overall system power consumption.

In some variants, the user interactions may be separated into multiple stages such that individual ROIs may be retrieved for each stage. For example, in most situations, the user's hands may be at rest or otherwise out of view (i.e., not within the captured image at all) and a user's eyes continuously scan without any particular subject of interest. Once a user's gaze is fixated on an object, then the smart glasses may identify a first ROI corresponding to the user's gaze point. Depending on the nature of the object, the smart glasses may enable augmented reality and/or extended reality (AR/XR) user interface controls so that the user can use their hands to e.g., gesture, manipulate virtual objects, etc.

More directly, even though both hand gestures and gaze point processing may be important, they may be handled with different processing elements according to different e.g., neural network training models, etc. For example, a gaze point ROI might be used to retrieve information from a QR code, a hand ROI might be processed with computer vision algorithms to determine the motion being made, etc. Minimizing ROI size for each distinct processing component may further reduce overall data transfer requirements and downstream processing.

Example Operation, Robust Eye-Tracking

As a brief aside, "interpupillary distance" or "pupillary distance" (PD) refers to the distance between the centers of the pupils of the eyes, usually measured in millimeters. PD varies widely across the human population; the mean male PD is around 64 mm, the mean female PD is around 62 mm. However, the range is nearly 17 mm across the entire human population (from the smallest female PD to largest male PD). "Dual PD" or "monocular PD" is the distance between the centers of each pupil to the bridge of the nose; this may be helpful where the nose is not perfectly centered between the eyes.

Currently, eye-tracking glasses are mostly used in specialized applications for medical diagnosis and market research. These eye-tracking glasses rely on fast frame rates (e.g., 120 Hz) and resolution granularities to carefully monitor user intention. In many cases, eye-tracking glasses use computationally expensive techniques to compensate for differences in PD. For example, multiple cameras can be used to simultaneously capture and stitch together images of the eyes. Unfortunately, the number of cameras, frame rates, resolutions, and processing tasks are unsuitable for the industrial design requirements of most smart glasses.

Figure 8:
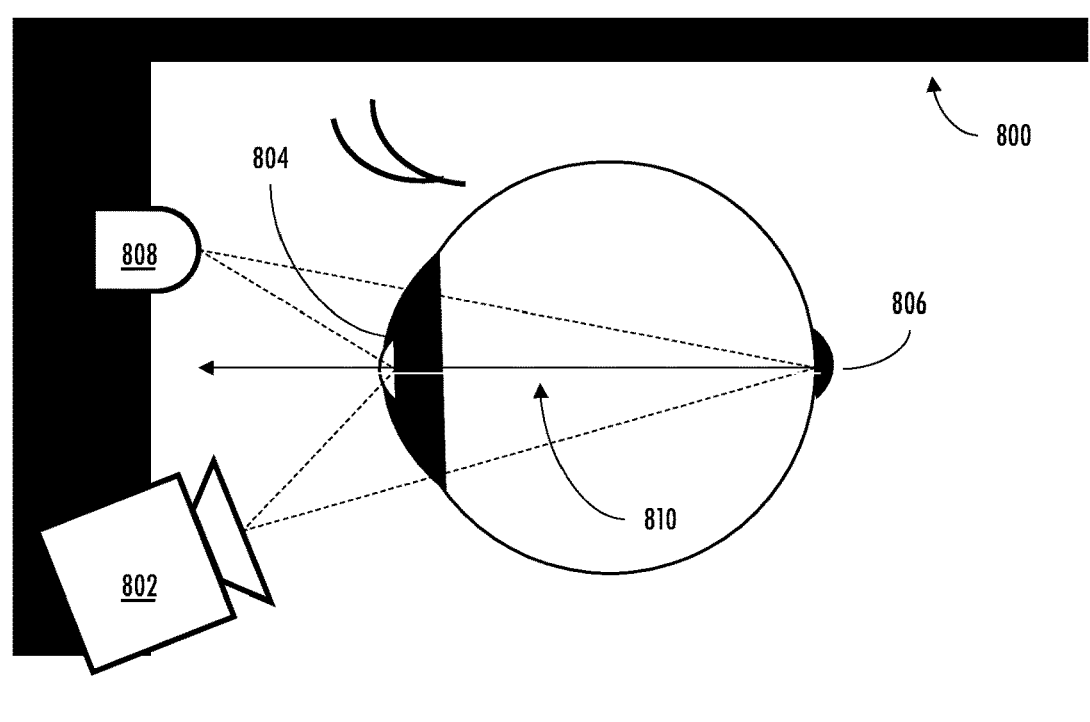
FIG. 8 is a graphical representation of exemplary smart glasses using anamorphic eye-tracking, useful in conjunction with various aspects of the present disclosure.
Figure 8:
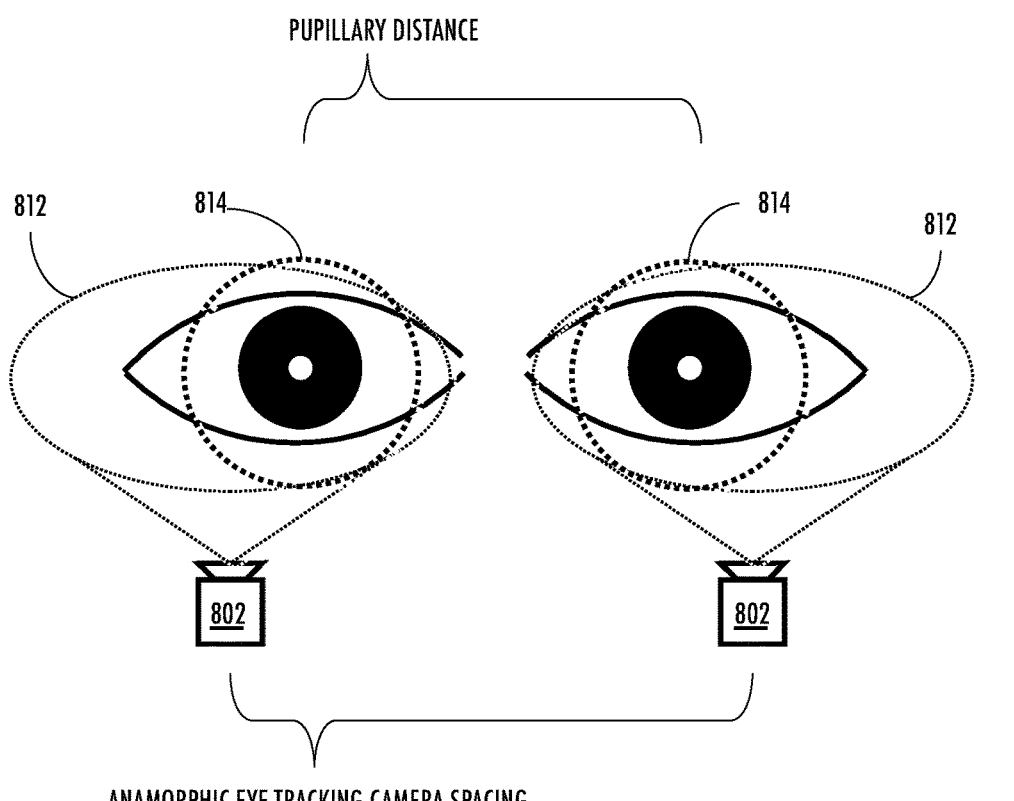

FIG. 8 is a graphical representation of exemplary smart glasses 800 using anamorphic eye-tracking. During operation, an infrared IR illuminator 808 illuminates the eye. The IR light is separately reflected by the pupil 804 and the retina 806, these reflections are detected by the anamorphic cameras 802. The position of the pupil 804 relative to the retina 806 is inferred from the reflections and used to calculate a gaze vector 810.

In one specific implementation, the anamorphic lenses are oriented with their major axis horizontally aligned to capture a wide image 812 of the eyes. In this configuration, the rows are larger than the columns. The illustrated anamorphic eye-tracking camera spacing can handle large variances in PD without using multiple cameras, stitching, etc. This greatly simplifies the manufacturing of the physical frames and may allow for more flexibility in physical frame design. In some cases, a single pair of smart glasses may also be shared between different users, e.g., this may be particularly useful for shared applications in industrial, and/or other multi-user scenarios.

In some variants, the anamorphic cameras 802 may use non-square photosite collectors that are reciprocally sized and/or non-square photosite binning to un-squeeze the anamorphic image (such as was previously described above). Thus, the eye-tracking output images retain a standard "square" pixel aspect ratio. More generally however, the techniques may be broadly extended to any un-squeeze processing, including e.g., linear interpolation techniques that are commonly used in conventional solutions.

As a brief aside, handling eyewear of any kind is generally undesirable (e.g., to avoid scratches and/or smudging). Additionally, eyewear is consistently worn in a physically precise location relative to the user's face e.g., eyes, ears, and mouth, which are also physically fixed in size and location. In other words, the location of the eyes relative to the smart glasses will not significantly change during use. Thus, some variants may incorporate aspects of column-based addressing (like row-based addressing, see e.g., Notable Optimization, Row-based Addressing). Specifically, during operation, the smart glasses may identify the portion 814 of the wide image 812 that corresponds to the eye activity. Only columns that correspond to optical reflections may be retrieved. Additionally, in some cases, columns that are not useful may be powered off. For reference, an anamorphic lens with 2:1 aspect ratio might only need half of the sensor to be active to perform eye-tracking.

As a separate but important tangent, anamorphic lenses have unique light bending characteristics. These characteristics change at different distances because of the different focal lengths between the major axis and minor axis. In other words, the position and intensity of a source of light impacts the geometry of an anamorphic reflection/refraction. The shape and geometry of the reflections will be more pronounced and visible when the source is positioned at an angle to the lens. The intensity of the source will also affect the size and brightness of the reflection. These characteristics may be leveraged to more accurately model gaze vectors.

As previously noted, the pupil and retina are at different distances and angles. These structures of the eye reflect light back to the anamorphic cameras 802. However, the resulting optical reflections which are focused by the anamorphic lens will have different behaviors depending on the distance and/or angle, relative to the lens. Unlike conventional eye-tracking which uses symmetric spherical lenses that provide identical reflection geometries, the light from the pupil has a different anamorphic streak size and shape than the light from the retina when passed through an anamorphic lens. This difference can be used to e.g., disambiguate which flare corresponds to the pupil and retina, as well as more accurately determine the relative angle and/or distance of the reflective surface.

System Architecture

Figure 9:
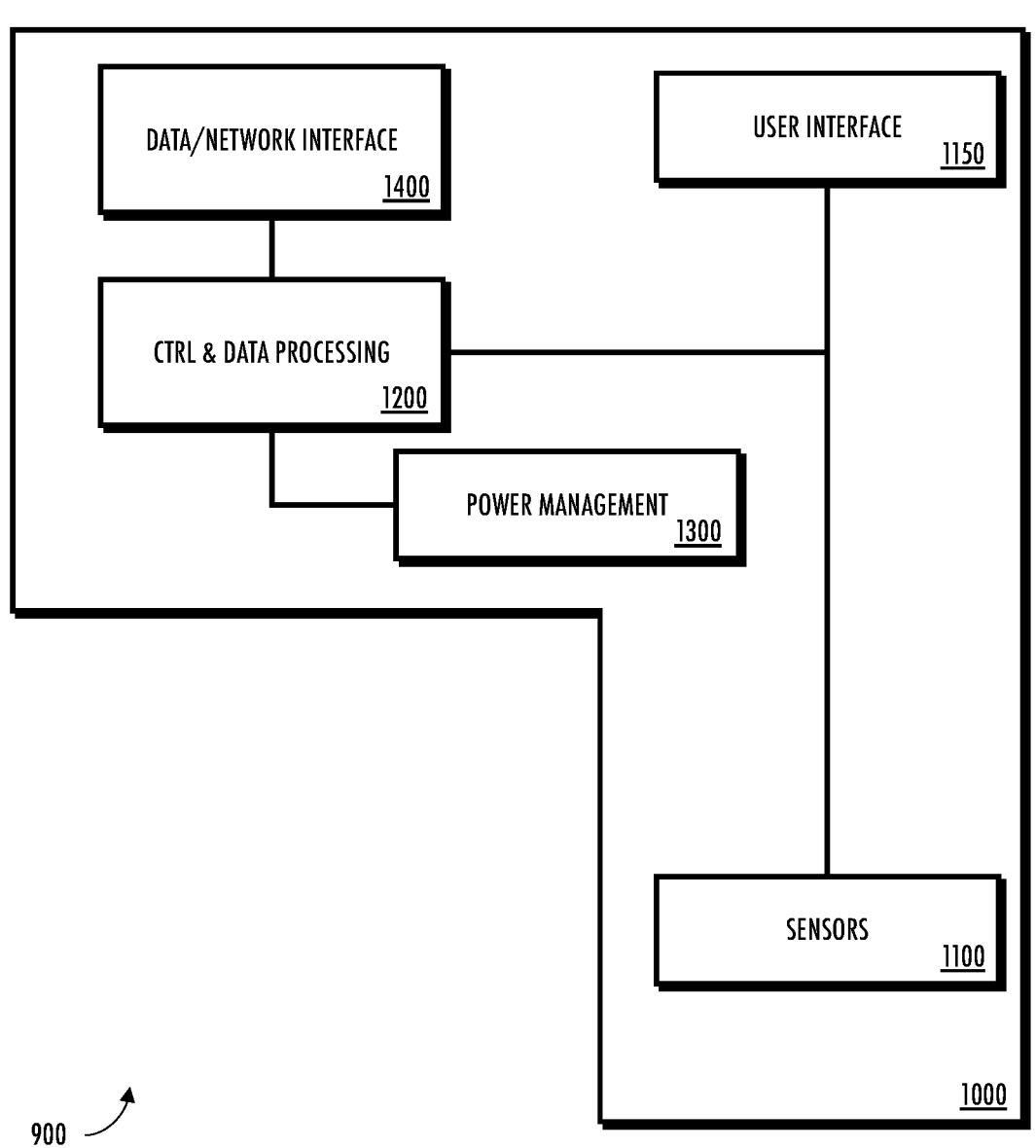
FIG. 9 is a logical block diagram of the exemplary smart glasses system, in accordance with various aspects of the present disclosure.

FIG. 9 is a logical block diagram of the exemplary smart glasses system 900. The system 900 includes: a physical frame 1000, a sensor subsystem 1100, a user interface subsystem 1150, control and data processing logic 1200, a power management subsystem 1300, and a data/network interface 1400. The physical frame 1000 attaches system 900 to the user, enabling either one or both hands to gesture (hands-free operation). The sensor subsystem 1100 captures data from the environment. The user interface subsystem 1150 monitors the user for user interactions and renders data for user consumption. The control and data processing logic 1200 obtains data generated by the user, other devices, and/or captured from the environment, to perform calculations and/or data manipulations. The resulting data may be stored, rendered to the user, transmitted to another party, or otherwise used by the system to carry out its tasks. The power management subsystem 1300 supplies and controls power for the system components. The data/network logic 1400 converts data for transmission to another device via removeable storage media or some other transmission medium.

The various logical subsystems described above may be logically combined, divided, hybridized, and/or augmented within various physical components of a device. As but one such example, an eye-tracking camera and forward-facing camera may be implemented as separate, or combined, physical assemblies. As another example, power management may be centralized within a single component or distributed among many different components; similarly, data processing logic may occur in multiple components of the system. More generally, the logical block diagram illustrates the various functional components of the system, which may be physically implemented in a variety of different manners.

While the present discussion describes anamorphic image capture and various computer vision processors in the context of smart glasses, the system may have broad applicability to any apparatus that can use different field-of-views (FOVs) in different dimensions. Such applications may include stationary and/or mobile applications. For example, anamorphic image capture and/or non-square components may allow for wide FOV vision assistance in cars, or parking assistance with 360° environmental cameras. Other useful applications may include smart doorbells, smart appliances, surveillance cameras, and/or other Internet of Things (IoT)/ Industrial IoT (IIoT) applications.

The following discussion provides functional descriptions for each of the logical entities of the exemplary system. Artisans of ordinary skill in the related arts will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary system 900 is separately provided below.

Functional Overview of the Physical Frame

A "physical frame" or a "frame" refers to any physical structure or combination of structures that supports and/or gives shape to the components of a system.

While the present disclosure is described in the context of eyewear frames that hold the anamorphic lens with a fixed orientation relative to a user's head, artisans of ordinary skill in the related arts will readily appreciate that the techniques may be extended to any form of headwear including without limitation: hats, visors, helmets, goggles, and/or headsets. In fact, a physical frame may not hold the user's head at all; the frame may be based on a relatively fixed head positioning determined from a known body position and/or intended use scenario—for example, a heads-up display in a smart car may be trained for the driver's head positioning (or passenger's positioning) to allow for sensory augmentation e.g., during driver operation, etc. As another such example, the components might be mounted-in, or distributed across, other accessories (e.g., necklaces, earrings, hairclips, etc.) that have a relatively fixed positioning relative to the user's head and torso.

As used herein, the term "hands-free" refers to operation of the device without requiring physical contact between the frame and its components, and the user's hands. Examples of physical contact (which are unnecessary during hands-free operation) may include e.g., button presses, physical taps, capacitive sensing, etc.

Furthermore, the concepts described throughout are broadly applicable to a variety of other applications beyond smart glasses. For example, a smart car may mount anamorphic lenses and sensor components on various points of the car frame. As another example, a smart doorbell may mount the anamorphic lenses and sensor components within an access panel frame. Smart phones and/or laptops may mount the anamorphic lenses and sensor components within their component housings. Various other structural frames may be substituted with equal success.

Physical Frame, Implementation and Design Considerations

Figure 10:
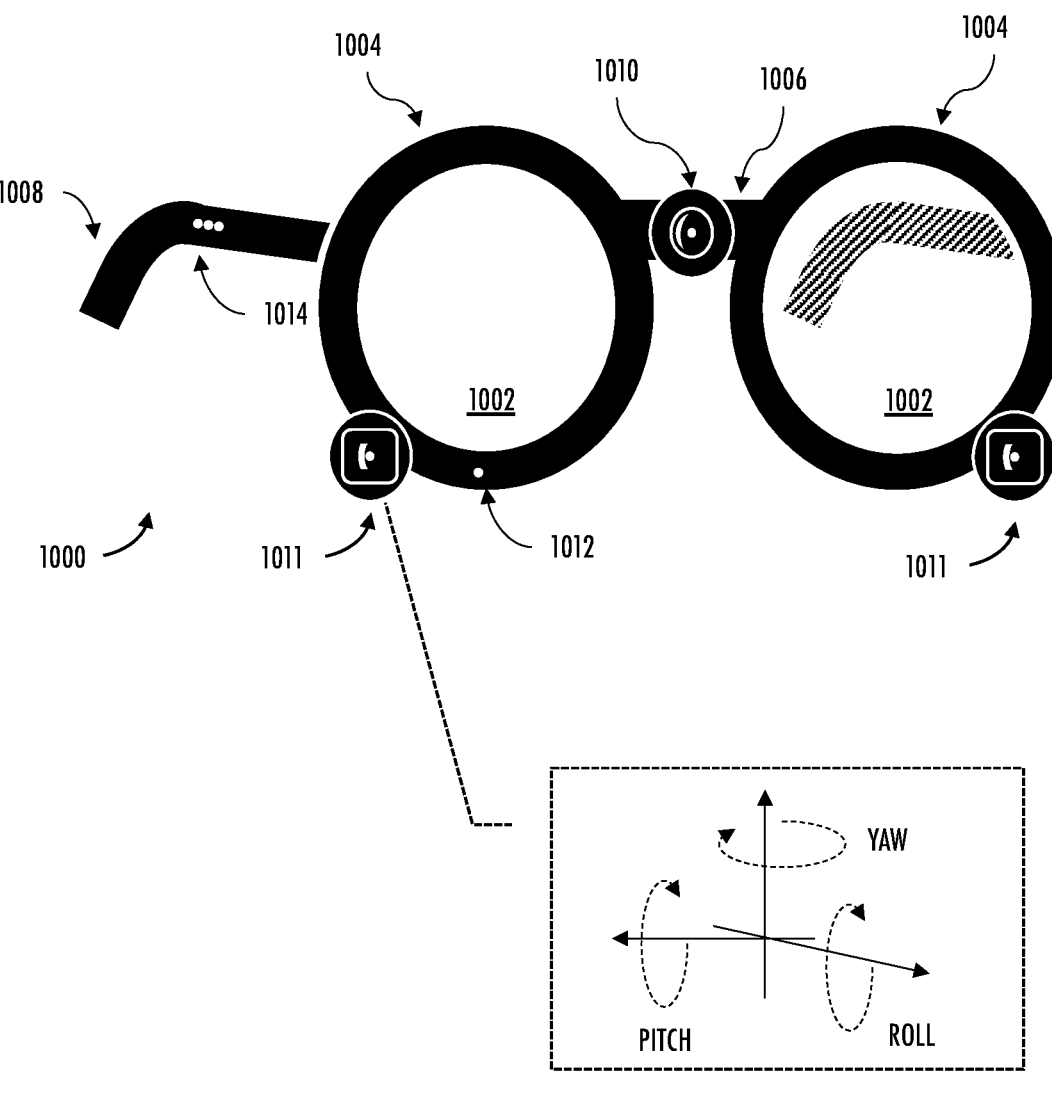
FIG. 10 is a graphical representation of a physical frame, useful in conjunction with various aspects of the present disclosure.

As shown in FIG. 10, the physical frame may be implemented as eyeglass frames that include lenses 1002 housed in rims 1004 that are connected by a bridge 1006. The bridge 1006 rests on the user's nose, and two arms 1008 rest on the user's ears. The frame may hold the various operational components of the smart glasses (e.g., spherical camera(s) 1010 and/or anamorphic cameras 1011, microphone(s) 1012, and speaker(s) 1014) in fixed locations relative to the user's sense/vocal organs (eyes, ears, mouth).

Physical frames may be manufactured in a variety of frame types, materials, and/or shapes. Common frame types include full-rimmed, semi-rimless, rimless, wire, and/or custom bridge (low bridge, high bridge). Full-rimmed glasses have rims that cover the full circumference of the lenses, semi-rimmed have some portion of the lens that expose an edge of the lenses, and rimless/wire glasses do not have any rim around the lenses. Some humans have differently shaped facial features; typically, custom bridge frames are designed to prevent glasses from slipping down certain types of noses. Common frame materials include plastic, acetate, wood, and metals (aluminum, stainless steel, titanium, silver, gold, etc.), and/or combinations of the foregoing. Common shapes include rectangle, oval, round, square, large, horn, brow-line, aviator, cat-eye, oversized and/or geometric shapes.

Larger and more substantial frames and materials may provide stability and/or support for mounting the various components of the device. For example, full-rimmed glasses may support a forward-facing and eye-tracking camera as well as speakers and/or microphone components, etc. Semi-rimmed and rimless/wire form factors may be lighter and/or more comfortable but may limit the capabilities of the glasses—e.g., only a limited resolution forward-facing camera to capture user hand gestures, etc. Similarly, custom bridge frames may provide more stability near the nose; this may be desirable for e.g., a more robust forward-facing camera. Material selection and/or frame types may also have functional considerations for smart glass operation; for example, plastics and woods are insulators and can manage thermal heat well, whereas metals may offer a higher strength to weight ratio.

As a practical matter, the physical frame may have a variety of "wearability" considerations e.g., thermal dissipation, device weight, battery life, etc. Some physical frame effects may be implicitly selected-for by the user. For example, even though customers often consider the physical frame to be a matter of personal style, the new capabilities described throughout may enable active functions that affect a user's experience; in some cases, this may influence the customer to make different selections compared to their non-smart eyewear, or to purchase multiple different smart glasses for different usages. Other physical frame effects may be adjusted based on user-to-frame metadata. In some cases, the user-to-frame metadata may be generated from user-specific calibration, training, and/or user configuration-in some cases, the user-to-frame metadata may be stored in data structures or "profiles". User-to-frame profiles may be useful to e.g., migrate training between different physical frames, ensure consistent usage experience across different frames, etc.

In one exemplary embodiment, the physical frame may center a camera assembly within the bridge 1006, between the user's eyes (shown in physical frame 1000). A centered placement provides a perspective view that more closely matches the user's natural perspective. While the physical frame 1000 is depicted with a spherical camera 1010, an anamorphic camera assembly may be centrally mounted within the bridge 1006 instead of, or in combination with, the spherical camera 1010. In some variants, the anamorphic cameras may be oriented with a vertical major axis or horizontal major axis.

In one exemplary embodiment, the physical frame may have anamorphic cameras 1011 mounted at the periphery of the rims 1004. A peripheral placement provides a view corresponding to a peripheral side of the user's natural perspective. In some variants, the anamorphic cameras 1011 may be oriented with their major axes e.g., vertical, horizontal, or at oblique angles.

In some such variants, the anamorphic cameras 1011 may additionally be tilted to provide visibility of either or, both of, the user's forward-facing gaze point and/or hands. Tilt may be static or adjustable by the user. As shown, "tilt" may occur in any of the three rotational dimensions (yaw, roll, and pitch), relative to the user's resting gaze and/or hand positioning. For example, pitch adjustments may allow the anamorphic lens to capture images at some latitudinal offset relative to the "horizon" of the user's resting gaze. This allows for visibility of the hands when they are above/below the user's resting gaze. Yaw adjustments allow the anamorphic lens to capture images at some longitudinal offset relative to the "meridian" of the user's resting gaze. This allows for visibility of the areas to the right and/or left of the user's resting gaze. Roll adjustments may allow the anamorphic lens to capture images at an oblique angle.

In one exemplary embodiment, the physical frame may have one or more inward-facing anamorphic cameras mounted on the interior of the rims 1004 or lenses 1002. An inward-facing placement provides a view of the user's eyes (useful for eye-tracking). In one specific variant, the anamorphic cameras may be oriented with a horizontal major axis.

Still other implementations may incorporate other camera assemblies. For example, certain lenses have a long focal length (e.g., telephoto lenses, etc.). In some embodiments, the physical frame may use a "periscope" prism to divert light perpendicular to the capture direction. Periscope prisms insert an additional optical element in the lens assembly and may increase manufacturing costs and/or reduce image quality. In still other embodiments, the camera assembly may be mounted along one or both arms. Offset placements allow for a much longer focal length but may induce parallax effects. Applications for cameras of different types is more thoroughly discussed within U.S. patent application Ser. No. 18/185,362 filed Mar. 16, 2023, and entitled "APPARATUS AND METHODS FOR AUGMENTING VISION WITH REGION-OF-INTEREST BASED PROCESSING", U.S. patent application Ser. No. 18/185,364 filed Mar. 16, 2023, and entitled "APPARATUS AND METHODS FOR AUGMENTING VISION WITH REGION-OF-INTEREST BASED PROCESSING", and U.S. patent application Ser. No. 18/185,366 filed Mar. 16, 2023, and entitled "APPARATUS AND METHODS FOR AUGMENTING VISION WITH REGION-OF-INTEREST BASED PROCESSING", previously incorporated above.

Functional Overview of the Sensor Subsystem

A "sensor" refers to any electrical and/or mechanical structure that measures, and records, parameters of the physical environment as analog or digital data. Most consumer electronics devices incorporate multiple different modalities of sensor data; for example, visual data may be captured as images and/or video, audible data may be captured as audio waveforms (or their frequency representations), inertial measurements may be captured as quaternions, Euler angles, or other coordinate-based representations.

While the present disclosure is described in the context of audio data, visual data, and/or IMU data, artisans of ordinary skill in the related arts will readily appreciate that the raw data, metadata, and/or any derived data may be substituted with equal success. For example, an image may be provided along with metadata about the image (e.g., facial coordinates, object coordinates, depth maps, etc.). Post-processing may also yield derived data from raw image data; for example, a neural network may process an image and derive one or more activations (data packets that identify a location of a "spike" activation within the neural network).

Sensor Subsystem, Implementation and Design Considerations

Figure 11:
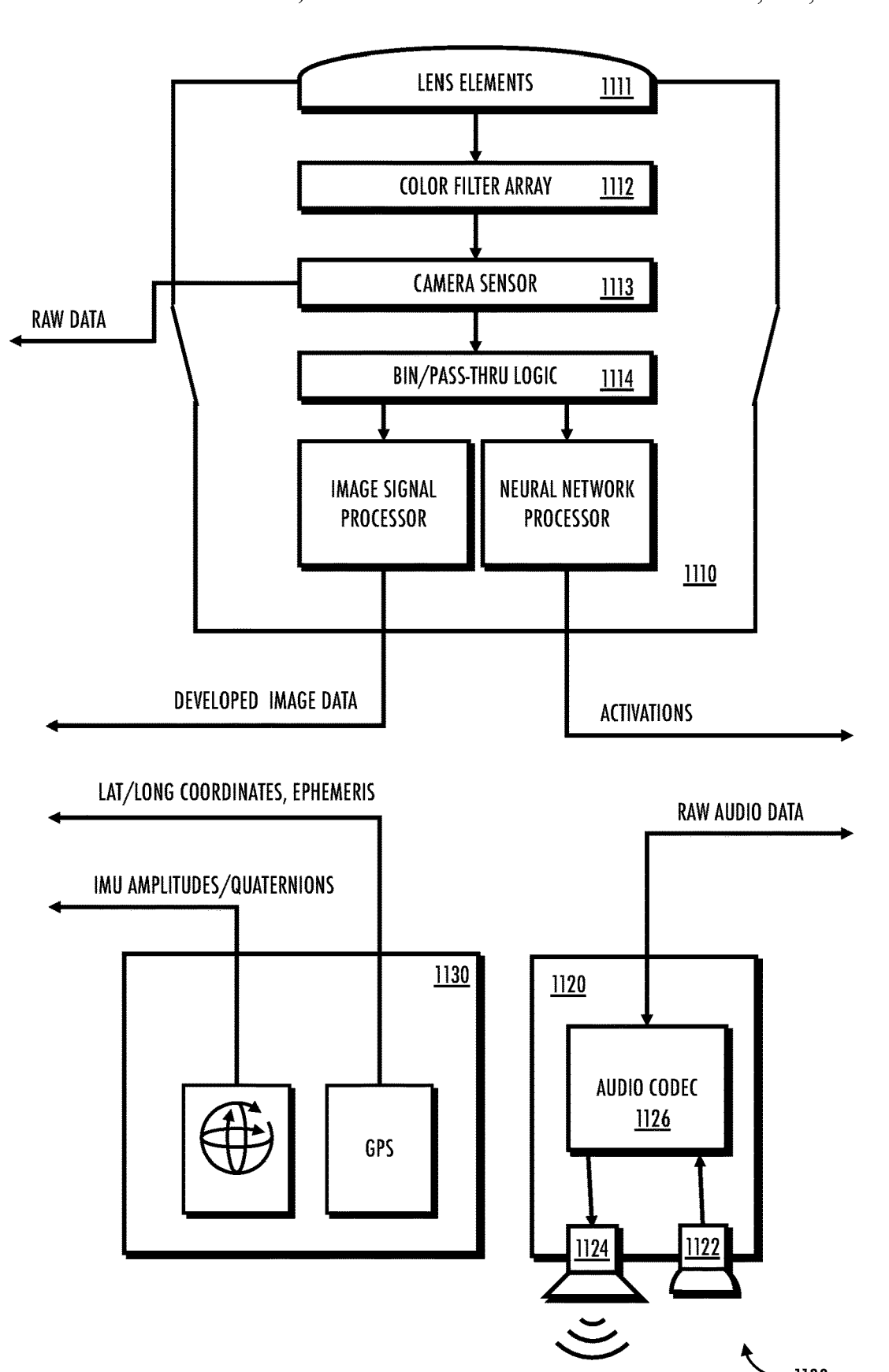
FIG. 11 is a logical block diagram of the various sensors of the sensor subsystem, useful in conjunction with various aspects of the present disclosure.

FIG. 11 is a logical block diagram of the various sensors of the sensor subsystem 1100. The sensor subsystem 1100 may include: one or more camera module(s) 1110, an audio module 1120, an accelerometer/gyroscope/magnetometer (also referred to as an inertial measurement unit (IMU 1130)), a display module (not shown), and/or Global Positioning System (GPS) system (not shown). In some embodiments, the sensor subsystem 1100 is an integral part of the first device. The following sections provide detailed descriptions of the individual components of the sensor subsystem 1100.

Camera Module

A camera lens 1111 bends (distorts) light to focus on the camera sensor 1113. The camera lens 1111 may focus, refract, and/or magnify light. It is made of transparent material such as glass or plastic and has at least one curved surface. When light passes through a camera lens 1111, it is bent or refracted in a specific way, which can alter the direction, size, and/or clarity of the image that is formed.

A radially symmetric camera lens has rotational symmetry around its optical axis. This means that the lens has the same properties and characteristics in all directions around the axis. As a practical matter, a radially symmetric camera lens is characterized by one focal length along the optical axis. Spherical lenses are examples of radially symmetric camera lenses; other lenses may be polynomial based, etc.

In contrast, a radially asymmetric camera lens has different properties and characteristics at different points along the optical axis. Anamorphic lenses are examples of radially asymmetric camera lenses. An anamorphic lens is cylindrical, and has at least two transverse axis (e.g., a major axis and a minor axes). Typically, the major axis provides an optical squeeze ratio (e.g., 2:1, 1.33:1, etc.) and the minor axis provides a normal aspect ratio (1:1), however, the major and minor axis may each have their own magnification/minification ratios. More generally, radially asymmetric camera lenses may have any number of curvatures and/or slopes.

In one specific implementation, the camera sensor 1113 senses light (luminance) via photoelectric sensors (e.g., photosites). A color filter array (CFA) 1112 filters light of a particular color; the CFA value provides a color (chrominance) that is associated with each sensor. The combination of each luminance and chrominance value provides a mosaic of discrete red, green, blue value/positions, that may be "demosaiced" to recover a numeric tuple (RGB, CMYK, YUV, YCrCb, etc.) for each pixel of an image. Notably, most imaging formats are defined for the human visual spectrum; however, machine vision may use other variants of light. For example, a computer vision camera might operate on direct raw data from the image sensor with a RCCC (Red Clear Clear Clear) color filter array that provides a higher light intensity than the RGB color filter array used in media application cameras.

As a brief aside, a "photosite" is a discrete light-sensitive component. Typically, photosites are physically arranged according to a two-dimensional pattern. While photosites are usually assumed to correspond to pixels, photosite geometry (e.g., rectangular, hexagonal, or other tessellated pattern) is device specific and irregular. For example, some pixels may be replaced with phase detection auto focus (PDAF), etc. In one exemplary embodiment, a photosite may have a "non-square" aspect ratio.

A "pixel" is the discrete unit of a digital image. A pixel defines a color value and brightness for a single point in an image. Since images are represented as a two-dimensional array, a pixel is assumed to be "square".

As used herein, the term "square" refers to geometric relationships and properties associated with a polygon with four equal sides and four equal angles. As a practical matter, few pixels are perfectly square; thus, any polygon that is tessellated at regular intervals in two orthogonal dimensions is considered "square." More directly, a square pixel refers to a pixel or photosite that is as wide as it is tall. "Substantially square" refers to a polygon with an aspect ratio that falls in the range 1.2:1 and 0.8:1. The term "non-square" refers to any geometric relationship other than square or substantially square. Thus, a non-square photosite might be rectangular with an aspect ratio of 1.33:1 or 2:1, hexagonally tesselated, etc.

In one embodiment, the camera sensor groups one or more photosites into a pixel. In some implementations, the photosites may directly correspond to pixels according to a one-to-one ratio. Notably, while conventional one-to-one mappings assume that the photosite and the pixel are similarly shaped/sized, variants of the present disclosure may preserve this mapping despite geometric differences; for example, a non-square photosite may directly correspond to a square pixel, due to a squeeze ratio of an anamorphic camera lens.

As used herein, the term "reciprocal" refers to a multiplicative inverse relationship. For example, a scalar value multiplied by its reciprocal is one. Ratios may have reciprocal ratios, for example, the ratio 4:3 (4/3) has a reciprocal of 3:4 (3/4).

In some embodiments, multiple photosites may be binned together to create a pixel. For example, non-square photosites may be binned together to create a square pixel. As but one such example, six photosites having an aspect ratio of 1:6 may be binned to create a square pixel. As noted above, photosite binning may additionally compensate for geometric differences between photosites and pixels; for example, non-square photosites may be binned according to a reciprocal relationship to correspond to a square pixel. As one such example, twelve photosites having an aspect ratio of 3:4 may be binned according to the reciprocal relationship 4:3 to achieve a single square pixel.

Furthermore, photosite binning may incorporate or otherwise compensate for the underlying sensor structure including e.g. color filter array and/or microlens structures. While different colors of light may not be directly summed together, image signal processing techniques may be used to "demosaic" colored light information collected by the photosites into pixel information.

Some cameras use an N-Bayer sensor that groups four, or even nine, "pixels" together to create a "binned pixel". During image signal processing, color information is redistributed across the binned pixels with a technique called "pixel binning" (using bin/pass-thru logic 1114). Pixel-binning provides better results and versatility than just interpolation/upscaling. For example, a camera can capture high resolution images (e.g., 108MPixels) in full-light; but in low-light conditions, the camera can emulate a much larger photosite with the same sensor (e.g., grouping pixels in sets of 9 to get a 12 MPixel "nona-binned" resolution).

In one exemplary embodiment, a "digital image" corresponds to a two-dimensional array of pixels (or binned pixels). Virtually all imaging technologies are descended from (and inherit the assumptions of) raster-graphics displays which displayed images line-by-line. A digital image may be any number of pixels wide and high (and therefore may have virtually any aspect ratio). However, images are generally assumed to be longer than they are tall (the rows are larger than columns).

Historically, display devices were unaware of image capture but could optimize for their own raster-graphics scan line style of operation. Conventional data formats assign one dimension to be "rows" and another dimension to be "columns"; the row and column nomenclature is used by other components and/or devices to access data. Most (if not all) devices assume that scan lines are rows that run horizontally (left to right), and columns that run vertically (top to bottom), consistent with conventional raster-scan style operation. Notably, under this paradigm, image data is encoded according to the default display orientation rather than its capture considerations.

During operation, the first device may make use of multiple camera systems to assess user interactions and the physical environment. The smart glasses may have one or more outward-facing cameras to capture the user's environment. Multiple forward-facing cameras can be used to capture different fields-of-view and/or ranges. Cameras with a non-fixed/"zoom" lens may also change its focal length to capture multiple fields of view. For example, a medium range camera might have a horizontal field-of-view (FOV) of 70°-120° whereas long range cameras may use a FOV of 35°, or less, and have multiple aperture settings. In some cases, a "wide" FOV camera (so-called fisheye lenses provide between 120° and 195°) may be used to capture periphery information along two transverse axis. In one exemplary embodiment, one or more anamorphic cameras may be used to capture a wide FOV in a first axis (major axis) and a medium range FOV in a second axis (minor axis).

The smart glasses may have one or more inward-facing cameras to capture the user's interactions. Multiple cameras can be used to capture different views of the eyes for eye-tracking. In one exemplary embodiment, one or more anamorphic cameras may be used to track eye movement; anamorphic cameras may have a wide FOV that allows for eye-tracking regardless of pupillary distance. Other implementations may use normal FOV cameras that are stitched together or otherwise processed jointly.

More generally, however, any camera lens or set of camera lenses may be substituted with equal success for any of the foregoing tasks; including e.g., narrow field-of-view (10° to) 90° and/or stitched variants (e.g., 360° panoramas). While the foregoing techniques are described in the context of perceptible light, the techniques may be applied to other electromagnetic (EM) radiation capture and focus apparatus including without limitation: infrared, ultraviolet, and/or X-ray, etc.

In some embodiments, the camera module(s) 1110 may include on-board image signal processing and/or neural network processing. On-board processing may be implemented within the same silicon or on a stacked silicon die (within the same package/module). Silicon and stacked variants reduce power consumption relative to discrete component alternatives that must be connected via external wiring, etc. Processing functionality is discussed elsewhere (see e.g., Control and Data Subsystem, further below).

In one exemplary embodiment, the camera module 1110 includes an anamorphic lens that is irremovably mounted in a fixed position relative to an array of non-square photosites. Unlike anamorphic camera attachments that may be removed to allow for normal photography with the same camera sensor, the exemplary camera module has a reciprocally matched relationship between the anamorphic lens and the array of non-square photosites such that an optical squeeze of the anamorphic lens corresponds to the aspect ratio of the non-square photosites. Some variants of the camera module may generate an array of photosite values according to the non-square aspect ratio (which correspond to pixels). Some variants may selectively deactivate photosites to provide a subset of the non-square aspect ratio.

In one exemplary embodiment, captured digital images may be stored or processed as data structures that are row-addressable for a vertically squeezed image, or column-addressable for a horizontally squeezed image. A row-addressable digital image can provide access to pixel values according to only the row index (without individual column indices). In some variants, a start column index and/or a stop column index may be used to remove unnecessary values. The pixel values for the row or a portion of the row are sequentially provided in a row read. Similarly, a column-addressable digital image can provide access to pixel values according to their column index; the column or its portion may be sequentially provided in a column read.

In some variants, the scan line addressable image data (in either row or column) is associated with a region-of-interest (ROI). The ROI may be associated with a set of rows, a set of columns, or a combination of rows and columns. In some cases, a forward-facing image may have multiple areas with different ROIs; each ROI may be separately addressable by different processing entities.

In some cases, a ROI may be associated with one or more user interactions. For example, an eye-tracking camera may provide gaze point information; the gaze point may be matched to a target area in a forward-facing image. The target area of the forward-facing camera may be analyzed with in-sensor (on-board) neural networks to e.g., identify a face, object, text, etc. The ROI is sized to encompass the identified object. Similarly, forward-facing cameras may capture hand movements. Depending on the hand movement, in-sensor (on-board) neural networks may be used to determine whether the hand motion is a valid user interaction. If the hand motion is valid user interaction, then the ROI is sized to encompass the hand, etc. ROI based user interaction and gesture based detection is discussed in greater detail within U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", and U.S. patent application Ser. No. 18/061,257 filed Dec. 2, 2022, and entitled "SYSTEMS, APPARATUS, AND METHODS FOR GESTURE-BASED AUGMENTED REALITY, EXTENDED REALITY", previously incorporated above.

More generally, however, a ROI may be any subset of the sensor which may be addressed by scan line (row or column). For example, an image may be subdivided into halves, thirds, quadrants, quarters, octants, etc. In some cases, the subdivision may be associated with a specific processing task e.g., an upper half for gaze point analysis, a lower half (or lower quadrants, quarters) for hand gesture recognition. In other cases, the subdivision may be associated with a particular usage configuration e.g., a set of columns corresponding to the user's eye size, positioning, and pupillary distance, etc. In some cases, subsets of the sensor may be selectively de-activated to further reduce power, etc.

In still other cases, an ROI may be determined by motion in the image, computer search and/or other recognition algorithms, etc. ROI-based detection is discussed in greater detail within U.S. patent application Ser. No. 18/185,362 filed Mar. 16, 2023, and entitled "APPARATUS AND METHODS FOR AUGMENTING VISION WITH REGION-OF-INTEREST BASED PROCESSING", U.S. patent application Ser. No. 18/185,364 filed Mar. 16, 2023, and entitled "APPARATUS AND METHODS FOR AUGMENTING VISION WITH REGION-OF-INTEREST BASED PROCESSING", and U.S. patent application Ser. No. 18/185,366 filed Mar. 16, 2023, and entitled "APPARATUS AND METHODS FOR AUGMENTING VISION WITH REGION-OF-INTEREST BASED PROCESSING", previously incorporated above.

Audio Module

The audio module 1120 typically incorporates a microphone 1122, speaker 1124, and an audio codec 1126. The microphone senses acoustic vibrations and converts the vibrations to an electrical signal (via a transducer, condenser, etc.). The electrical signal is provided to the audio codec, which samples the electrical signal and converts the time domain waveform to its frequency domain representation. Typically, additional filtering and noise reduction may be performed to compensate for microphone characteristics. The resulting audio waveform may be compressed for delivery via any number of audio data formats. To generate audible sound, the audio codec 1126 obtains audio data and decodes the data into an electrical signal. The electrical signal can be amplified and used to drive the speaker 1124 to generate acoustic waves.

Commodity audio codecs generally fall into speech codecs and full spectrum codecs. Full spectrum codecs use the modified discrete cosine transform (mDCT) and/or mel-frequency cepstral coefficients (MFCC) to represent the full audible spectrum. Speech codecs reduce coding complexity by leveraging the characteristics of the human auditory/speech system to mimic voice communications. Speech codecs often make significant trade-offs to preserve intelligibility, pleasantness, and/or data transmission considerations (robustness, latency, bandwidth, etc.).

While the audio module 1120 depicts a single microphone and speaker, an audio module may have any number of microphones and/or speakers. For example, multiple speakers may be used to generate stereo sound and multiple microphones may be used to capture stereo sound. More broadly, any number of individual microphones and/or speakers can be used to constructively and/or destructively combine acoustic waves (also referred to as beamforming).

In some embodiments, the audio module 1120 may include on-board audio processing and/or neural network processing to assist with voice analysis and synthesis. These functions are discussed elsewhere (see e.g., Control and Data Subsystem, further below).

Inertial Measurement Unit and Positioning

The inertial measurement unit (IMU) 1130 includes one or more accelerometers, gyroscopes, and/or magnetometers. Typically, an accelerometer uses a damped mass and spring assembly to measure proper acceleration (i.e., acceleration in its own instantaneous rest frame). In many cases, accelerometers may have a variable frequency response. Most gyroscopes use a rotating mass to measure angular velocity; a MEMS (microelectromechanical) gyroscope may use a pendulum mass to achieve a similar effect by measuring the pendulum's perturbations. Most magnetometers use a ferromagnetic element to measure the vector and strength of a magnetic field; other magnetometers may rely on induced currents and/or pickup coils. The IMU uses the acceleration, angular velocity, and/or magnetic information to calculate quaternions that define the relative motion of an object in four-dimensional (4D) space. Quaternions can be efficiently computed to determine velocity (both head direction and speed).

More generally, however, any scheme for detecting user velocity (direction and speed) may be substituted with equal success for any of the foregoing tasks. Other useful information may include pedometer and/or compass measurements. While the foregoing techniques are described in the context of an inertial measurement unit (IMU) that provides quaternion vectors, artisans of ordinary skill in the related arts will readily appreciate that raw data (acceleration, rotation, magnetic field) and any of their derivatives may be substituted with equal success.

Global Positioning System (GPS) is a satellite-based radio navigation system that allows a user device to triangulate its location anywhere in the world. Each GPS satellite carries very stable atomic clocks that are synchronized with one another and with ground clocks. Any drift from time maintained on the ground is corrected daily. In the same manner, the satellite locations are known with great precision. The satellites continuously broadcast their current position. During operation, GPS receivers attempt to demodulate GPS satellite broadcasts. Since the speed of radio waves is constant and independent of the satellite speed, the time delay between when the satellite transmits a signal and the receiver receives it is proportional to the distance from the satellite to the receiver. Once received, a GPS receiver can triangulate its own four-dimensional position in spacetime based on data received from multiple GPS satellites. At a minimum, four satellites must be in view of the receiver for it to compute four unknown quantities (three position coordinates and the deviation of its own clock from satellite time). In so-called "assisted GPS" implementations, ephemeris data may be downloaded from cellular networks to reduce processing complexity (e.g., the receiver can reduce its search window).

In one exemplary embodiment, GPS and/or route information may be used to identify the geographic area that a user has traveled in and/or will pass through. In some cases, this may allow for better predictions as to the current user context (e.g., at home, at work, at the gym, etc.).

In some embodiments, the IMU 1130 may include on-board telemetry processing and/or neural network processing to assist with telemetry analysis and synthesis. These functions are discussed elsewhere (see e.g., Control and Data Subsystem, further below).

Functional Overview of the User Interface Subsystem

Functionally, the "user interface" refers to the physical and logical components of the system that interact with the human user. A "physical" user interface refers to electrical and/or mechanical devices that the user physically interacts with. An "augmented reality" user interface refers to a user interface that incorporates an artificial environment that has been overlaid on the user's physical environment. A "virtual reality" user interface refers to a user interface that is entirely constrained within a "virtualized" artificial environment. An "extended reality" user interface refers to any user interface that lies in the spectrum from physical user interfaces to virtual user interfaces.

User Interface Subsystem, Implementation and Design Considerations

The user interface subsystem 1150 encompasses the visual, audio, and tactile elements of the device that enable a user to interact with it. In addition to physical user interface devices that use physical buttons, switches, and/or sliders to register explicit user input, the user interface subsystem may also incorporate various components of the sensor subsystem 1100 to sense user interactions. For example, the user interface may include: a display module to present information, eye-tracking camera sensor(s) to monitor gaze fixation, hand-tracking camera sensor(s) to monitor for hand gestures, a speaker to provide audible information, and a microphone to capture voice commands, etc.

Display Module

The display module (not shown) is an output device for presentation of information in a visual form. Different display configurations may internalize or externalize the display components within the lens. For example, some implementations embed optics or waveguides within the lens and externalize the display as a nearby projector or micro-LEDs. As another such example, some implementations project images into the eyes.

In one exemplary embodiment, the display module may be incorporated within the device as a display that is overlaps the user's visual field. Examples of such implementations may include so-called "heads up displays" (HUDs) that are integrated within the lenses, or projection/reflection type displays that use the lens components as a display area. Existing integrated display sizes are typically limited to the lens form factor, and thus resolutions may be smaller than handheld devices e.g., 640×320, 1280×640, 1980×1280, etc. For comparison, handheld device resolutions that exceed 2560×1280 are not unusual for smart phones, and tablets can often provide 4K UHD (3840×2160) or better. In some embodiments, the display module may be external to the glasses and remotely managed by the device (e.g., screen casting). For example, the smart glasses can encode a video stream that is sent to a user's smart phone or tablet for display. The display module may be used where the smart glasses present and provide interaction with text, pictures, and/or AR/XR objects. For example, the AR/XR object may be a virtual keyboard and a virtual mouse. During such operation, the user may invoke a command (e.g., a hand gesture) that causes the smart glasses to present the virtual keyboard for typing by the user. The virtual keyboard is provided by presenting images on the smart glasses such that the user may type without contact to a physical object. One of ordinary skill in the art will appreciate that the virtual keyboard (and/or mouse) may be displayed as an overlay on a physical object, such as a desk, such that the user is technically touching a real-world object. However, input is measured by tracking user movements relative to the overlay, previous gesture position(s), etc. rather than receiving a signal from the touched object (e.g., as a conventional keyboard would).

Eye-Tracking and Hand-Tracking Modules

The user interface subsystem may incorporate an "eye-tracking" camera to monitor for gaze fixation (a user interaction event) by tracking saccadic or microsaccadic eye movements. Eye-tracking embodiments may greatly simplify camera operation since the eye-tracking data is primarily captured for standby operation (discussed below). In addition, the smart glasses may incorporate "hand-tracking" or gesture-based inputs. Gesture-based inputs and user interactions are more broadly described within e.g., U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", and U.S. patent application Ser. No. 18/061,257 filed Dec. 2, 2022, and entitled "SYSTEMS, APPARATUS, AND METHODS FOR GESTURE-BASED AUGMENTED REALITY, EXTENDED REALITY", previously incorporated by reference in their entireties.

While the present discussion describes eye-tracking and hand-tracking cameras, the techniques are broadly applicable to any outward-facing and inward-facing cameras. As used herein, the term "outward-facing" refers to cameras that capture the surroundings of a user and/or the user's relation relative to the surroundings. For example, a rear outward-facing camera could be used to capture the surroundings behind the user. Such configurations may be useful for gaming applications and/or simultaneous localization and mapping (SLAM-based) applications. As used herein, the term "inward-facing" refers to cameras that capture the user e.g., to infer user interactions, etc.

Voice Control and Audio Speaker Modules

The user interface subsystem may incorporate microphones to collect the user's vocal instructions as well as the environmental sounds. As previously noted above, the audio module may include on-board audio processing and/or neural network processing to assist with voice analysis and synthesis.

The user interface subsystem may also incorporate speakers to reproduce audio waveforms. In some cases, the speakers may incorporate noise reduction technologies and/or active noise cancelling to cancel out external sounds, creating a quieter listening environment for the user. This may be particularly useful for sensory augmentation in noisy environments, etc.

Functional Overview of the Control and Data Processing Subsystem

Functionally, the control and data subsystem controls the operation of a device and stores and processes data. Logically, the control and data subsystem may be subdivided into a "control path" and a "data path." The data path is responsible for performing arithmetic and logic operations on data. The data path generally includes registers, arithmetic and logic unit (ALU), and other components that are needed to manipulate data. The data path also includes the memory and input/output (I/O) devices that are used to store and retrieve data. In contrast, the control path controls the flow of instructions and data through the subsystem. The control path usually includes a control unit, that manages a processing state machine (e.g., a program counter which keeps track of the current instruction being executed, instruction register which holds the current instruction being executed, etc.). During operation, the control path generates the signals that manipulate data path operation. The data path performs the necessary operations on the data, and the control path moves on to the next instruction, etc.

Control and Data, Implementation and Design Considerations

The control and data processing logic 1200 may include one or more of: a central processing unit (CPU), an image signal processor (ISP), one or more neural network processors (NPUs), and their corresponding non-transitory computer-readable media that store program instructions and/or data. In one exemplary embodiment, the control and data subsystem includes processing units that execute instructions stored in a non-transitory computer-readable medium (memory). More generally however, other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

Processor and Memory Implementations

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU may be primarily used to control device operation and/or perform tasks of arbitrary complexity/best-effort. CPU operations may include, without limitation: operating system (OS) functionality (power management, UX), memory management, gesture-specific tasks, etc. Typically, such CPUs are selected to have relatively short pipelining, longer words (e.g., 32-bit, 64-bit, and/or super-scalar words), and/or addressable space that can access both local cache memory and/or pages of system virtual memory. More directly, a CPU may often switch between tasks, and must account for branch disruption and/or arbitrary memory access.

In contrast, the image signal processor (ISP) performs many of the same tasks repeatedly over a well-defined data structure. Specifically, the ISP maps captured camera sensor data to a color space. ISP operations often include, without limitation: demosaicing, color correction, white balance, and/or autoexposure. Most of these actions may be done with scalar vector-matrix multiplication. Raw image data has a defined size and capture rate (for video) and the ISP operations are performed identically for each pixel; as a result, ISP designs are heavily pipelined (and seldom branch), may incorporate specialized vector-matrix logic, and often rely on reduced addressable space and other task-specific optimizations. ISP designs only need to keep up with the camera sensor output to stay within the real-time budget; thus, ISPs more often benefit from larger register/data structures and do not need parallelization.

Other processor subsystem implementations may multiply, combine, further subdivide, augment, and/or subsume the foregoing functionalities within these or other processing elements. For example, multiple ISPs may be used to service multiple camera sensors. Similarly, neural network functionality (discussed below) may be subsumed with either CPU or ISP operation via software emulation.

Neural Network and Machine Learning Implementations

The device may include one or more neural network processors (NPUs). Unlike conventional "Turing"-based processor architectures (discussed above), neural network processing emulates a network of connected nodes (also known as "neurons") that loosely model the neuro-biological functionality found in the human brain. While neural network computing is still in its infancy, such technologies already have great promise for e.g., compute rich, low power, and/or continuous processing applications.

Within the context of the present disclosure, the NPUs may be used to analyze the presence of one or more user interaction(s) at varying levels of confidence. Conventional image processing techniques process the entire image data structure, an NPU may process subsets/aspects of the image data. The computational complexity may be scaled according to the stage (which corresponds to the confidence of detection.). Conceptually, neural network processing uses a collection of small nodes to loosely model the biological behavior of neurons. Each node receives inputs, and generates output, based on a neuron model (usually a rectified linear unit (ReLU), or similar). The nodes are connected to one another at "edges". Each node and edge are assigned a weight.

Each processor node of a neural network combines its inputs according to a transfer function to generate the outputs. The set of weights can be configured to amplify or dampen the constituent components of its input data. The input-weight products are summed and then the sum is passed through a node's activation function, to determine the size and magnitude of the output data. "Activated" neurons (processor nodes) generate output "activations". The activation may be fed to another node or result in an action on the environment. Coefficients may be iteratively updated with feedback to amplify inputs that are beneficial or dampen inputs that are not.

The behavior of the neural network may be modified during an iterative training process by adjusting the node/edge weights to reduce an error gradient. The computational complexity of neural network processing is a function of the number of nodes in the network. Neural networks may be sized (and/or trained) for a variety of different considerations. For example, increasing the number of nodes may improve performance and/or robustness noise rejection whereas reducing the number of nodes may reduce power consumption and/or improve latency.

Many neural network processors emulate the individual neural network nodes as software threads, and large vector-matrix multiply accumulates. A "thread" is the smallest discrete unit of processor utilization that may be scheduled for a core to execute. A thread is characterized by: (i) a set of instructions that is executed by a processor, (ii) a program counter that identifies the current point of execution for the thread, (iii) a stack data structure that temporarily stores thread data, and (iv) registers for storing arguments of opcode execution. Other implementations may use hardware or dedicated logic to implement processor node logic, however neural network processing is still in its infancy and has not yet become a commoditized semiconductor technology.

As used herein, the term "emulate" and its linguistic derivatives refers to software processes that reproduce the function of an entity based on a processing description. For example, a processor node of a machine learning algorithm may be emulated with "state inputs", and a "transfer function", that generate an "action."

Unlike the Turing-based processor architectures, machine learning algorithms learn a task that is not explicitly described with instructions. In other words, machine learning algorithms seek to create inferences from patterns in data using e.g., statistical models and/or analysis. The inferences may then be used to formulate predicted outputs that can be compared to actual output to generate feedback. Each iteration of inference and feedback is used to improve the underlying statistical models. Since the task is accomplished through dynamic coefficient weighting rather than explicit instructions, machine learning algorithms can change their behavior over time to e.g., improve performance, change tasks, etc.

Typically, machine learning algorithms are "trained" until their predicted outputs match the desired output (to within a threshold similarity). Training is broadly categorized into "offline" training and "online" training. Offline training models are trained once using a static library, whereas online training models are continuously trained on "live" data. Offline training allows for reliable training according to known data and is suitable for well-characterized behaviors. Furthermore, offline training on a single data set can be performed much faster and at a fixed power budget/training time, compared to online training via live data. However, online training may be necessary for applications that must change based on live data and/or where the training data is only partially-characterized/uncharacterized. Many implementations combine offline and online training to e.g., provide accurate initial performance that adjusts to system-specific considerations over time.

In some implementations, the neural network processor may be a standalone component of the system. In such implementations, the neural network processor may translate activation data (e.g., neural network node activity) into data structures that are suitable for system-wide use. Typically, such implementations use a data structure defined according to application programming interfaces (APIs) exposed by other components. Functionally, an API interface allows one program to request/provide a service to another program; while the exemplary system allows API calls between separate components, the API framework may be used with equal success within a component. For example, a system-on-a-chip (SoC) may provide the activation data and/or its associated metadata via an API. Some SoC implementations may also provide memory-mapped accessibility for direct data manipulation (e.g., via a CPU).

In some implementations, the NPU may be incorporated within a sensor (e.g., a camera sensor) to process data captured by the sensor. By coupling an NPU closely (on-die) with the sensor, the processing may be performed with lower power demand. In one aspect, the sensor processor may be designed as customized hardware that is dedicated to processing the data necessary to enable interpretation of relatively simple user interaction(s) to enable more elaborate gestures. In some cases, the sensor processor may be coupled to a memory that is configured to provide storage for the data captured and processed by the sensor. The sensor processing memory may be implemented as SRAM, MRAM, registers, or a combination thereof.

Conventional computer vision algorithms generate post-processed image data (a 2-dimensional array of pixel data) whereas neural network vision computer vision generates activations. Neural network-based image recognition may have multiple advantages over conventional image recognition techniques. Raw image capture data (e.g., photosite values) are camera-specific i.e., the pixel values are a combination of both the photosite and color-filter array geometry. Raw image capture data cannot be directly displayed to a human as a meaningful image-instead raw image data must be "developed" into standardized display formats (e.g., JPEG, TIFF, MPEG, etc.). The developing process incurs multiple ISP image operations e.g., demosaicing, white balance, color adjustment, etc. In contrast, neural network processing can be trained to use raw image data (e.g., photosite values) as input rather than post-ISP image data (as is done with conventional image recognition techniques). Furthermore, neural network activations represent a node state within the neural network i.e., that the node has accumulated signal potential above a threshold value. If properly trained, neural networks can provide robust detection with very little power. Activation data is both much less frequent, and much more compact, compared to post-processed image/video data.

In some embodiments, an on-chip neural network processing at the sensor and can convey activations off-chip, such as is more generally described within e.g., U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", and U.S. patent application Ser. No. 18/061,257 filed Dec. 2, 2022, and entitled "SYSTEMS, APPARATUS, AND METHODS FOR GESTURE-BASED AUGMENTED REALITY, EXTENDED REALITY", previously incorporated by reference in their entireties.

As a related note, a gaze point is a "point" in space, a point/area on a 2D image, or a point/volume in 3D space, to varying degrees of accuracy. Additional processing may be necessary to determine a region-of-interest (ROI), based on the likely object that the user is interested in. Various embodiments of the present disclosure perform ROI determination within on-chip neural network processing at the sensor. In other words, rather than using conventional "pixel-by-pixel" computer vision-based algorithms within a processor, machine learning and sensor technologies are combined to provide region-of-interest (ROI) recognition based on neural network activations at the sensor components-in this manner, only the cropped ROI may be transferred across the bus, processed for objects, stored to memory, etc. Avoiding unnecessary data transfers/manipulations (and greatly reducing data size) across a system bus further reduces power requirements.

As a related tangent, various applications of the present disclosure may have particularly synergistic results from on-chip ROI-determination. For example, an anamorphic image may capture both a user's gaze point and/or hands; these may be individually accessible as separate ROIs by separate neural networking logic. This provides multiple benefits: smaller ROIs take less power to transfer and process. In fact, consuming more power to perform ROI-determination on-chip at the sensor may be more efficient and result in lower power downstream compared to other alternatives (e.g., sending incorrect ROI and/or more image data.).

While the foregoing discussion is presented in the context of visual data, the concepts are broadly applicable to all sensed modalities (e.g., audio, IMU, etc.). For example, rather than sending a continuous audio file, an audio processor might only send specific audio snippets, or even audio which has been pre-processed.

Other Notable Logic Implementations

Application specific integrated circuits (ASICs) and field-programmable gate arrays (FPGAs) are other "dedicated logic" technologies that can provide suitable control and data processing for a smart glasses system. These technologies are based on register-transfer logic (RTL) rather than procedural steps. In other words, RTL describes combinatorial logic, sequential gates, and their interconnections (i.e., its structure) rather than instructions for execution. While dedicated logic can enable much higher performance for mature logic (e.g., 50×+ relative to software alternatives), the structure of dedicated logic cannot be altered at run-time and is considerably less flexible than software.

Application specific integrated circuits (ASICs) directly convert RTL descriptions to combinatorial logic and sequential gates. For example, a 2-input combinatorial logic gate (AND, OR, XOR, etc.) may be implemented by physically arranging 4 transistor logic gates, a flip-flop register may be implemented with 12 transistor logic gates. ASIC layouts are physically etched and doped into silicon substrate; once created, the ASIC functionality cannot be modified. Notably, ASIC designs can be incredibly power-efficient and achieve the highest levels of performance. Unfortunately, the manufacture of ASICs is expensive and cannot be modified after fabrication—as a result, ASIC devices are usually only used in very mature (commodity) designs that compete primarily on price rather than functionality.

FPGAs are designed to be programmed "in-the-field" after manufacturing. FPGAs contain an array of look-up-table (LUT) memories (often referred to as programmable logic blocks) that can be used to emulate a logical gate. As but one such example, a 2-input LUT takes two bits of input which address 4 possible memory locations. By storing "1" into the location of 0#b'11 and setting all other locations to be "0" the 2-input LUT emulates an AND gate. Conversely, by storing "0" into the location of 0#b'00 and setting all other locations to be "1" the 2-input LUT emulates an OR gate. In other words, FPGAs implement Boolean logic as memory-any arbitrary logic may be created by interconnecting LUTs (combinatorial logic) to one another along with registers, flip-flops, and/or dedicated memory blocks. LUTs take up substantially more die space than gate-level equivalents; additionally, FPGA-based designs are often only sparsely programmed since the interconnect fabric may limit "fanout." As a practical matter, an FPGA may offer lower performance than an ASIC (but still better than software equivalents) with substantially larger die size and power consumption. FPGA solutions are often used for limited-run, high performance applications that may evolve over time.

Un-Squeezing Non-Square Image Data, Generalized Operation

In one embodiment, the control and data processing subsystem may be used to store data locally at the device. In one exemplary embodiment, data may be stored as non-transitory symbols (e.g., bits read from non-transitory computer-readable mediums). In one specific implementation, a memory subsystem including non-transitory computer-readable medium is physically realized as one or more physical memory chips (e.g., NAND/NOR flash) that are logically separated into memory data structures. The memory subsystem may be bifurcated into program code and/or program data. In some variants, program code and/or program data may be further organized for dedicated and/or collaborative use. For example, the ISP and CPU may share a common memory buffer to facilitate large transfers of data therebetween. Similarly, the codec may have a dedicated memory buffer to avoid resource contention.

In some embodiments, the program code may be statically stored within the device as firmware. In other embodiments, the program code may be dynamically stored (and changeable) via software updates. In some such variants, software may be subsequently updated by external parties and/or the user, based on various access permissions and procedures.

Figure 12:
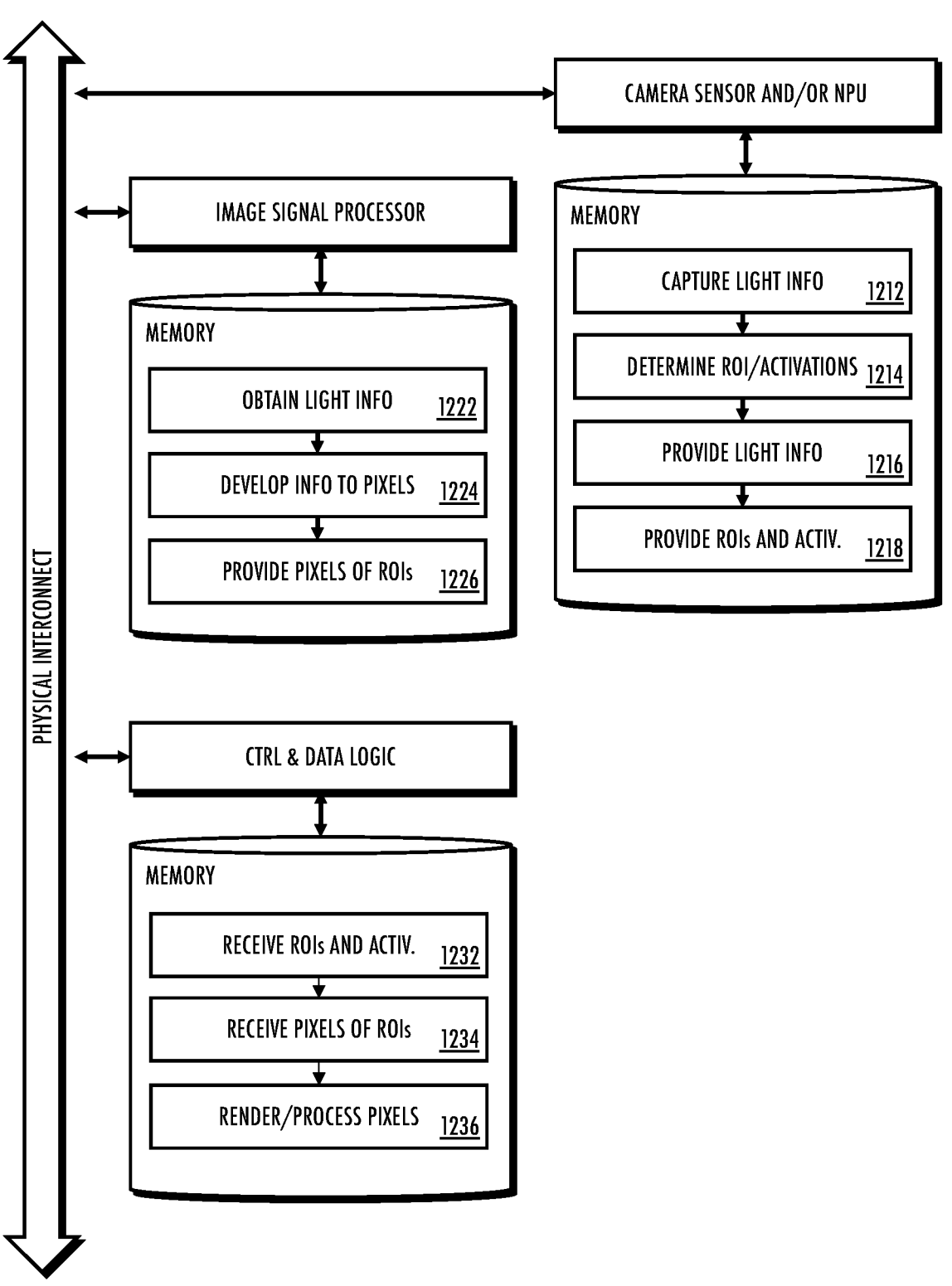
FIG. 12 depicts a generalized implementation of anamorphic image data processing, in accordance with various aspects of the present disclosure.
Figure 13:
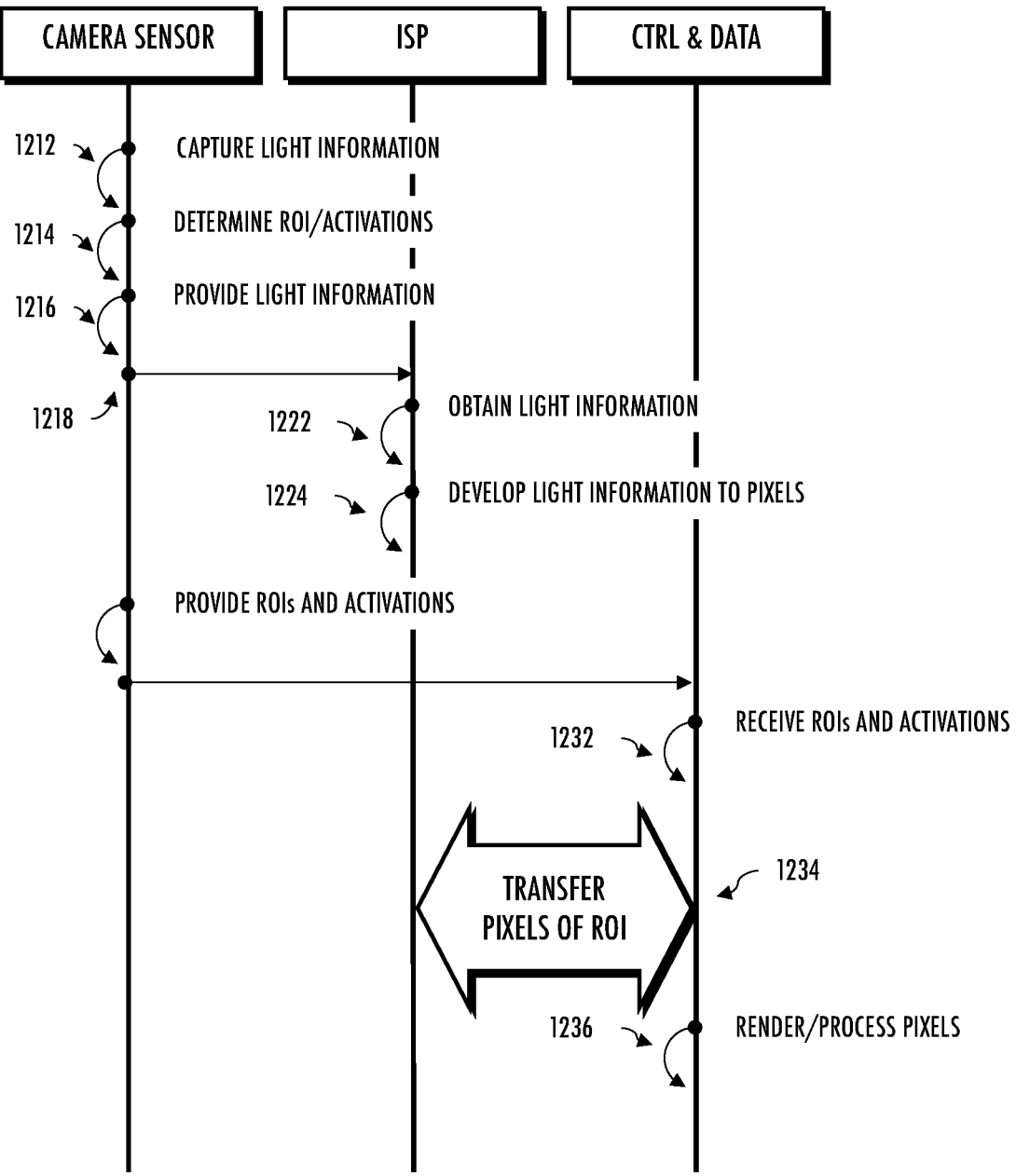
FIG. 13 depicts a chronological sequence (ladder diagram) of anamorphic image data processing, according to the logic of FIG. 12.

FIG. 12 depicts a generalized implementation of anamorphic image data processing. In addition, FIG. 13 depicts a chronological sequence (ladder diagram) of anamorphic image data processing, according to the logic of FIG. 12. In the illustrated embodiment, the non-transitory computer-readable medium includes a first routine that captures non-square image for pre-processing. When executed by the control and data subsystem, the first routine causes the user device to: capture light information, determine regions-of-interest (ROIs) and/or activation data (if any), provide the light information, and provide the ROIs and/or activation data. The following discussion explores these steps in more detail.

At step 1212, a camera sensor captures light information. In some embodiments, the light information is collected via square photoelectric elements (e.g., "photosites"). In some embodiments, the non-square light information is collected via non-square "photosites". The camera sensor reads each photosite collector to determine a voltage corresponding to the number of photons that have been collected by the photosite since the last read or refresh. The voltage is quantized to a digital value, which is stored to memory. In some cases, the memory may be overwritten at a frame interval (e.g., for video). In other cases, the memory may persist until read or erased (e.g., for individual image captures). More generally, any technique for converting light energy into digital data may be substituted with equal success.

In some embodiments, the camera sensor may deactivate (power down) portions of the sensor that are not in use. This may allow the sensor to further reduce power consumption. In some variants, the deactivated portions may be statically configurable e.g., based on user configuration. In other variants, the deactivated portions may be dynamically configured based on e.g., user training, user profiles, calibration, history of use, ongoing activity, etc.

While the present disclosure is discussed in the context of square and rectangular photosites virtually any geometry may be substituted with equal success. Other structures may be circular, triangular, pentagonal, hexagonal, and/or any other polygon or combination of polygon tessellation. Most camera sensors have a regular and repeating tessellation, however irregular or non-repeating tessellations may be substituted with equal success. For example, a fisheye camera module might have photosites that increase in size or change polygonal shape at larger radial offsets corresponding to the fisheye barrel distortion, etc.

In some embodiments, the array of collected light information may correspond to a field-of-view (FOV). The FOV may be characterized by one or more dimensions. For example, a two-dimensional image may have a first dimension referred to as rows, and a second dimension referred to as columns. A three-dimensional image may have an additional dimension such as e.g., depth, distance, etc. Higher-order dimensional imaging may be substituted with equal success.

In one specific implementation, the FOV is determined by a physical lens element relative to a sensor. The physical lens element may be characterized by one or more focal lengths. In some cases, the physical lens may be a radially symmetric lens having one focal length. In one specific example, the physical lens may be a radially asymmetric lens having two or more focal lengths. Anamorphic lenses are cylindrical and have a major axis and a minor axis; other lenses may be oblong or oblate.

In some embodiments, the light information for each photosite corresponds to the light focusing characteristics of a physical lens element. In one specific example, non-square light information for each photosite has a reciprocal relationship to an optical squeeze of the physical lens element. In other implementations, the non-square light information for multiple photosites (e.g., 2×3, 3×4, 1×6, etc.) may correspond to the light focusing characteristics of a physical lens element. While the foregoing examples are discussed in the context of a reciprocal relationship, other arithmetic or geometric relationships may be substituted with equal success. For example, a fisheye lens might have photosites that are shaped and/or cropped to provide a wide FOV (e.g., >120°) in one dimension, but a substantially normal FOV in another (less than 90° e.g., ~60°).

At step 1214, the camera sensor determines regions-of-interest (ROIs) and/or activation data (if any) based on the light information. Neural network processing complexity is a function of the number nodes (rather than image size), and neural network processing may be performed on raw sensor data (rather than demosaiced image data).

In some cases, the ROI may be based on information from a different camera system. For example, an eye-tracking camera may provide the location (e.g. absolute coordinates, relative coordinates based on the size of some external object or screen, etc.). In some variants, each eye may be separately tracked to better estimate the gaze point for people with certain health conditions e.g., amblyopia, etc. In other cases, the ROI may be determined in-sensor using onboard neural networks or other image detection/recognition logic. The ROI may be based on a gaze point (or other user interaction) and/or detection and recognition algorithms (hands, faces, text, objects, etc.).

While the foregoing scheme is based on a neural network-based ROI, reduced complexity variants may use a fixed localization scheme (i.e., the entire captured image data may be subdivided into regions). As but one such example, the entire captured image may be subdivided halves, thirds, quadrants, quarters, octants, etc. In some cases, the subdivision may be associated with a specific processing task e.g., an upper half for gaze point analysis, a lower half (or lower quadrants, quarters) for hand gesture recognition. Notably, such implementations could be under/over-inclusive, depending on the nature of the user's gaze—i.e., a gaze point at the boundary is likely to result in a ROI with only part of the interesting image information. Consequently, some such variants may have some degree of overlap and/or hysteresis during transitions to ensure that the ROI contains both the gaze point and some adjacent image data. More generally, any section-based system may be substituted with equal success (e.g., N×M grids, hexagonal gridding, mixed-polygon gridding, etc.).

While the disclosed embodiments describe a "region" of captured data that is associated with a user's interest, artisans of ordinary skill in the related arts will readily appreciate that any representative data may be substituted with equal success. Representative data may have a different size, resolution, geometry, frame rate, color palette, etc. than the originally captured sensor data. For example, a black-and-white image may be used to represent a full-color image. Similarly, a reduced resolution image may be used to represent a full-resolution image. More directly, the ROI is not merely limited to spatial subsets, but can be broadly construed as any subset of the captured data.

At step 1216, the camera sensor provides the light information for image "development". In some cases, the camera sensor may also provide the ROIs and/or activation data for downstream processing (step 1218). While the illustrated example is presented with a specific order (e.g., FIG. 13), artisans of ordinary skill in the related arts will readily appreciate that the data transfer may occur concurrently, or in reverse order.

Data may be structured as an array, two-dimensional array, or higher-order array as well as scalar values or enumerated states. For example, light information may be provided as a two-dimensional array, whereas ROIs and spike activations may be transmitted as according to specific data structures (row and column pairs, enumerated states, and/or data packets, etc.).

In some embodiments, the data may be "pulled" (read by other logic). In other embodiments, the data may be "pushed" (transmitted to other logic). In some embodiments, data transfers may occur via sequential signaling (e.g., multiple values at a time) or other direct memory access. In other embodiments, data transfers may occur via a packet addressing scheme or a value at a time.

In one exemplary embodiment, the light information may be provided line-by-line. In some variants, all rows are transferred. In other variants, all columns are transferred. Certain variants may only transfer a subset of the rows corresponding to a region-of-interest (ROI). Certain implementations may additionally use a start column index and/or a stop column index to further reduce data transmissions. Similarly, certain variants may only transfer a subset of the columns corresponding to a region-of-interest. Further optimized transfers may use a start row index and/or a stop row index.

While the illustrated example is presented in the context of a camera sensor in communication with an image signal processor (ISP) and other control/data path logic (e.g., CPU, NPU, etc.), artisans of ordinary skill in the related arts will readily appreciate that any on-board or discrete logic may use be substituted with equal success.

In some embodiments, the non-transitory computer-readable medium also includes a second routine that develops non-square image for downstream processing. When executed by the control and data subsystem, the second routine causes the user device to: obtain light information, develop the light information to create image pixels, and provide the pixels for downstream processing. The following discussion explores these steps in more detail.

At step 1222, an image signal processor (ISP) obtains light information. In one exemplary embodiment, the ISP reads one or more digital values that are associated with a non-square photosite. The non-square photosite may additionally be associated a specific color filter (e.g., red, green, or blue). Here, the camera sensor light information is also commonly referred to as "raw" image data; raw data is device-specific and only describes one color for each photosite location of the sensor. Notably, certain locations of the sensor may be missing or unavailable (e.g., certain photosites may be used for phase detection autofocus (PDAF)). Thus, not every location of a two-dimensional array may have valid color information. More directly, raw data does not have color tuples that are suitable for display as pixels (e.g., red, green, and blue).

Typically, the raw data may additionally include information that identifies various characteristics of the capture (e.g., ISO, shutter speed, exposure settings, etc.). This information may be used by an ISP to modify the light information. For example, the capture settings may affect the color correction, white balance, etc. In one exemplary embodiment, the raw data further includes the lens type and/or characteristics of the lens. For example, a radially symmetric lens might identify the lens polynomial or spherical cap that approximates the lens curvature. A radially asymmetric lens might identify the lens curvature and/or slope according to a geometric function along one or more axis or a number of piecewise descriptions. For example, an anamorphic lens might be described as a cylinder with a spherical lens, a toric lens, or a similar geometric construct.

As previously noted, light information may be read from the camera sensor line-by-line (rows, columns, etc.). The camera sensor provides a portion of the total light information corresponding to a region-of-interest (ROI) of the sensor, or the entire sensor. In one embodiment, the light information is associated with a non-square aspect ratio; in other words, the size of the rows is a numeric ratio of the size of the columns. For example, a 2:1 aspect ratio would have rows that are twice as long as columns, or columns twice as long as rows. The aspect ratio may correspond to a light focusing characteristic of a physical lens element (e.g., an optical squeeze).

At step 1224, the ISP develops the light information to create image pixels. The process of developing the raw data to image data generally includes demosaicing. In other words, the demosaicing algorithms interpolate the missing color values and/or resolve differences in space to create a full two-dimensional array of square pixels (i.e., color tuple). The process involves using known color values at specific locations to estimate the missing color values of each pixel in the image. In addition to demosaicing, the ISP may additionally perform color correction, auto-white balance, etc.

Various embodiments of the present disclosure additionally consider the effects of the physical lens element when interpreting the captured light information. In some cases, the ISP may use the lens type and/or characteristics of the lens extracted from raw data to determine the appropriate correction. For example, a lens that has an optical squeeze can provide its squeeze ratio. The squeeze ratio may be used to determine the appropriate un-squeeze techniques during the developing process. In some cases, un-squeezing may be done digitally by stretching and smoothing the resulting values. In other cases, un-squeezing may be done by digitally binning light information to counteract the physical characteristics of the lens element. In still other cases, un-squeezing may be reduced or even eliminated by the physical structure of the photosites themselves.

At step 1226, the ISP provides the pixels for downstream processing. Images are structured as a two-dimensional array of pixels. Many embedded devices have a shared file structure for the processing logic; in other words, multiple processors may each access different points of a memory file system concurrently. As but one such example, the ISP may write to a ping-pong buffer, FIFO, or similar memory structure. Another processing entity may read from the ping-pong buffer, FIFO or similar memory structure at a separate read pointer. Additional mechanisms may be used to ensure that the read pointer does not overtake the write pointer.

Other devices have a dedicated file structure for each processing logic. There are a variety of different techniques for managing dedicated file structures. As but one such example, a memory management unit (MMU) may provide pointers to dedicated memory spaces for processing elements. As but one such example, the ISP may request a memory buffer. A MMU grants a pointer to a memory buffer. The ISP writes the image data to the memory buffer. After completion, the ISP releases its write pointer. The MMU provides a read pointer to a recipient processor; in some cases, the MMU may additionally fire an interrupt to notify the recipient that a data transfer is pending. More generally, artisans of ordinary skill will readily appreciate that any data transfer technique may be substituted with equal success.

In one exemplary embodiment, the image data may be provided line-by-line. In some variants, all rows are transferred. In other variants, all columns are transferred. Certain variants may only transfer a subset of the rows corresponding to a region-of-interest (ROI). Certain implementations may additionally use a start column index and/or a stop column index to further reduce data transmissions. Similarly, certain variants may only transfer a subset of the columns corresponding to a region-of-interest. Further optimized transfers may use a start row index and/or a stop row index.

In some embodiments, the non-transitory computer-readable medium may include a third routine that processes square pixels. When executed by the control and data subsystem, the third routine causes the user device to: obtain pixels, obtain activations, and render and/or process the pixels based on the activations. The following discussion explores these steps in more detail.

At step 1232, a processor receives regions-of-interest (ROIs) and/or activation data. As previously noted, the ROIs and/or spike activations may be received according to specific data structures (row and column pairs, enumerated states, and/or data packets, etc.). For example, the camera sensor may provide the location of a gaze point ROI, and one or more ROIs associated with hands. As previously noted, many different processors may receive ROIs and/or activations-in some cases, the camera sensor may signal multiple processors concurrently. For example, neural networking processors may receive ROIs to e.g., identify objects of interest, discern user interactions, etc. Similarly, a CPU may receive an activation that triggers subsequent user interface processing, etc.

Typically, the processor will request the corresponding image data. However, there may be circumstances where the processor may ignore the ROIs and/or activation data based on e.g., current tasks, available resources (power, processing bandwidth, memory space, etc.), historic data, etc.

At step 1234, the processor retrieves image pixels corresponding to the ROIs. Images may be transferred via a shared memory file system or via dedicated file structures. In some cases, the processor may receive the ROI in its unencoded format (raw), developed format (pixel data), or even encoded format (audio/visual container). In some cases, the ROI may be transferred as grayscale; grayscale is suitable for most computer-vision applications and is substantially smaller than full color data. In some variants, the ROI may be additionally encoded, compressed, and/or otherwise formatted for data transmission. More generally, any sensor data, derived data and/or other metadata generated from the captured data may be transferred for analysis, storage, rendering, processing, or additional post-processing.

As used herein, the term "metadata" refers to descriptive data that provides information about the captured data or a portion of it (e.g., an ROI). Metadata is commonly used to convey format, time/location, keywords, tags, descriptions, etc. "Derived data" might include any data that is specifically derived from, or otherwise inferred from, the image content of the captured data or ROI itself. Examples might include e.g., text generated from OCR or audio analysis, URLs extracted from QR codes, spike activations, metadata tagging, and/or any other representation of data.

At step 1236, the processor processes the pixels based on the activation data. In some embodiments, the ROI may be directly processed or presented to the user via another device. For example, the smart phone may present a ROI of an anamorphic image (captured by the smart glasses) to the user. In some cases, the other device may mirror the user device's display (e.g., both devices display the ROI). In other implementations, the other device and the user device may display distinct versions of the ROI; e.g., a smart phone or laptop may have a different size, resolution, geometry, frame rate, color palette, etc. than the smart glasses. In some cases, differences in device capabilities may enable rendering and/or processing capabilities that are substantially different than the user device. Examples of such capabilities might include e.g. access to external network databases, more extensive processing, cloud computing resources, and/or more extensive user input. For example, a user might use their finger to manually drag the image on a touchscreen and/or open links to identified URLs, etc.

While the foregoing examples are shown with a specific division of processing logic and memories, other variants may subdivide, aggregate, and/or merge the tasks among any number of control and data processing logic. For example, the tasks may be performed entirely within one chip (e.g., no off-chip data transfers) or one device (e.g., no off-device transfers). Alternatively, the tasks may be performed across multiple chips and/or incorporate multiple devices (e.g., staged processing complexity).

Power Management Subsystem

The power management subsystem 1300 provides power to the system. Typically, power may be sourced from one or more power sources. Examples of power sources may include e.g., disposable and/or rechargeable chemical batteries, charge storage devices (e.g., super/ultra capacitors), and/or power generation devices (e.g., fuel cells, solar cells). Rechargeable power sources may additionally include charging circuitry (e.g., wired charging and/or wireless induction). In some variants, the power management subsystem may additionally include logic to control the thermal exhaust and/or power draw of the power sources for wearable applications.

During operation, the power management subsystem 1300 provides power to the components of the system based on their power state. In one exemplary embodiment, the power states may include an "off" or "sleep" state (no power), one or more low-power states, and an "on" state (full power). Transitions between power states may be described as "putting to sleep", "waking-up", and their various linguistic derivatives.

As but one such example, a camera sensor's processor may include: an "off" state that is completely unpowered; a "low-power" state that enables power, clocking, and logic to check interrupts; a "on" state that enables image capture. During operation, another processor may "awaken" the camera sensor's processor by providing power via the power management subsystem. After the camera sensor's processor enters its low-power state, it services the interrupt; if a capture is necessary, then the camera sensor's processor may transition from the "low-power" state to its "on" state.

Various other power management subsystems may be substituted with equal success, given the contents of the present disclosure.

Data/Network Interface Subsystem

Functionally, the data/network interface subsystem 1400 enables communication between devices. For example, smart glasses may communicate with a companion device during operation. The companion device may be a smartphone, a computing device, a computer, a laptop, a server, a smart television, a kiosk, an interactive billboard, etc. In some cases, the system may also need to access remote data (accessed via an intermediary network). For example, a user may want to look up a menu from a QR code (which visually embeds a network URL) or store a captured picture to their social network, social network profile, etc. In some cases, the user may want to store data to removable media. These transactions may be handled by a data interface and/or a network interface.

The network interface may include both wired interfaces (e.g., Ethernet and USB) and/or wireless interfaces (e.g., cellular, local area network (LAN), personal area network (PAN)) to a communication network. As used herein, a "communication network" refers to an arrangement of logical nodes that enables data communication between endpoints (an endpoint is also a logical node). Each node of the communication network may be addressable by other nodes; typically, a unit of data (a data packet) may be traverse across multiple nodes in "hops" (a segment between two nodes). For example, smart glasses may directly connect, or indirectly tether to another device with access to, the Internet. "Tethering" also known as a "mobile hotspot" allows devices to share an internet connection with other devices. For example, a smart phone may use a second network interface to connect to the broader Internet (e.g., 5G/6G cellular); the smart phone may provide a mobile hotspot for a smart glasses device over a first network interface (e.g., Bluetooth/Wi-Fi), etc.

The data interface may include one or more removeable media. Removeable media refers to a memory that may be attached/removed from the system. In some cases, the data interface may map ("mount") the removable media to the system's internal memory resources to expand the system's operational memory.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A device comprising:
   a camera module comprising:
      an array of photosites;
      an anamorphic lens characterized by an optical squeeze ratio that is different than 1, the anamorphic lens irremovably mounted in a fixed position relative to the array of photosites, where each photosite of the array of photosites is characterized by a reciprocal aspect ratio to the optical squeeze ratio; and
      machine learning logic configured to:
         receive and process light information comprising raw sensor data from the array of photosites; and
         send a subset of the light information from the array of photosites to a processing device; and
   the processing device comprising:
      a processor; and
      a non-transitory computer-readable medium comprising instructions that when executed by the processor, cause the processor to:
         receive from the camera module the subset of the light information from the array of photosites; and
         demosaic the subset of the light information to create a region of interest image.

2. The device of claim 1, where the device comprises a smart doorbell.

3. The device of claim 1, where the camera module is horizontally mounted within an access panel.

4. The device of claim 1, where the device comprises a smart car.

5. The device of claim 4, where the camera module is externally mounted to capture surroundings of the smart car.

6. The device of claim 4, where the camera module is internally mounted to capture a user interaction of a user of the smart car.

7. The device of claim 1, where the device comprises an Internet of Things (IOT) device.

8. The device of claim 1, where the device comprises a smart phone.

9. A camera module comprising:
   an array of photosites;
   an anamorphic lens characterized by an optical squeeze ratio that is different than 1, the anamorphic lens irremovably mounted in a fixed position relative to the array of photosites, where each photosite of the array of photosites is characterized by a reciprocal aspect ratio to the optical squeeze ratio; and
   a machine learning processor configured to:
      receive and process light information from the array of photosites; and
      send a subset of the light information from the array of photosites as an output of the camera module, where the light information and the subset of the light information comprises non-demosaiced image data.

10. The camera module of claim 9, further comprising a physical frame configured to support the anamorphic lens, where:

the anamorphic lens is characterized by a major axis in a fixed orientation relative to the array of photosites and a minor axis, the major axis of the anamorphic lens is characterized by a first magnification, the minor axis of the anamorphic lens is characterized by a second magnification, and the first magnification is greater than the second magnification.

11. The camera module of claim 10, where:

the physical frame is configured to be used in a first orientation, and the major axis of the anamorphic lens is vertically-oriented with respect to the first orientation of the physical frame.

12. The camera module of claim 10, where:

the physical frame is configured to be used in a first orientation, and the major axis of the anamorphic lens is horizontally-oriented with respect to the first orientation of the physical frame.

13. The camera module of claim 10, where:

the physical frame is configured to be installed onto another device in a first fixed orientation, and the major axis of the anamorphic lens is obliquely-oriented with respect to the first fixed orientation of the physical frame.

14. The camera module of claim 9, further comprising a color filter array characterized by the reciprocal aspect ratio to the optical squeeze ratio.

15. The camera module of claim 9, where the anamorphic lens is configured to optically squeeze light based on the optical squeeze ratio and the each photosite of the array of photosites is configured to optically un-squeeze light based on the reciprocal aspect ratio.

16. A method of accessing a camera module, comprising:

causing the camera module to capture light information via an array of photosites that are irremovably mounted in a fixed position relative to an anamorphic lens, where the anamorphic lens is characterized by an optical squeeze ratio that is different than 1 and each photosite of the array of photosites is characterized by a reciprocal aspect ratio to the optical squeeze ratio; and obtaining region-of-interest light information from the camera module, the region-of-interest light information determined based on a determination by a machine learning processor in the camera module configured to process the light information, where the region-of-interest light information comprises non-demosaiced image data.

17. The method of claim 16, further comprising obtaining, by a device accessing the camera module, neural network activations associated with the light information from the camera module.

18. The method of claim 16, where the camera module further comprises a Red Clear Clear Clear (RCCC) color filter array.

19. The method of claim 16, where the camera module further comprises a Bayer color filter array.

20. The method of claim 19, further comprising developing one or more pixels from the light information.

* * * * *